United States Patent [19]
Assa et al.

[11] Patent Number: 6,052,650
[45] Date of Patent: Apr. 18, 2000

[54] ENFORCING CONSISTENCY IN GEOSCIENCE MODELS

[75] Inventors: Steven Brent Assa; Christoph Clemens Ramshorn, both of Austin, Tex.

[73] Assignee: Schlumberger Technology Corporation, Austin, Tex.

[21] Appl. No.: 08/806,381

[22] Filed: Feb. 27, 1997

[51] Int. Cl.⁷ .................................................. G06F 19/00
[52] U.S. Cl. .............................................................. 702/14
[58] Field of Search ................................. 702/18, 17, 16, 702/14, 13

[56] References Cited

U.S. PATENT DOCUMENTS

| | | | |
|---|---|---|---|
| 4,314,338 | 2/1982 | Suau et al. | |
| 4,340,934 | 7/1982 | Segesman | 364/422 |
| 4,679,174 | 7/1987 | Gelfand | 367/73 |
| 4,821,214 | 4/1989 | Sederberg | 364/552 |
| 4,858,149 | 8/1989 | Quarendon | 395/125 |
| 4,890,242 | 12/1989 | Sinha et al. | 395/119 |
| 4,912,664 | 3/1990 | Weiss et al. | 364/577 |
| 4,922,254 | 5/1990 | Schuessler et al. | 342/25 |
| 4,928,233 | 5/1990 | Millis | 364/522 |
| 4,944,034 | 7/1990 | Ohsawa | 364/522 |
| 4,969,130 | 11/1990 | Wason et al. | 367/73 |
| 4,991,095 | 2/1991 | Swanson | 364/421 |
| 5,003,498 | 3/1991 | Ota et al. | 364/522 |
| 5,010,502 | 4/1991 | Diebel et al. | 364/522 |
| 5,012,431 | 4/1991 | Stanziola | 364/526 |
| 5,214,613 | 5/1993 | Esmersoy | 367/31 |
| 5,229,976 | 7/1993 | Boyd et al. | 367/73 |
| 5,309,360 | 5/1994 | Monk et al. | 702/17 |
| 5,355,088 | 10/1994 | Howard, Jr. | 324/339 |
| 5,394,325 | 2/1995 | Schneider, Jr. | 364/421 |
| 5,553,492 | 9/1996 | Barrett et al. | 73/152 |
| 5,583,825 | 12/1996 | Carrazzone et al. | 702/17 |
| 5,647,058 | 7/1997 | Agrawal et al. | 395/601 |
| 5,682,330 | 10/1997 | Seaman et al. | 364/551 |

FOREIGN PATENT DOCUMENTS

| | | |
|---|---|---|
| 0 299 862 A2 | 1/1987 | European Pat. Off. . |
| 2300736 | 11/1996 | United Kingdom . |
| 2309562 | 7/1997 | United Kingdom . |
| WO 91/04544 | 4/1991 | WIPO ........................................ 15/72 |
| WO 97/38330 | 10/1997 | WIPO . |
| PCT/US 97/24278 | 5/1998 | WIPO . |
| PCT/US 97/24279 | 6/1998 | WIPO . |

OTHER PUBLICATIONS

Ames, Arlo, "Production ready feature recognition based automatic group technology part coding", proceedings of *Symposium on Solid Modeling Foundations and CAD/CAM Applications,* Rossignac/Turner editors, Austin, TX, Jun. 5–7, 1991, p. 161.

Baumgart, B., "Winged–edge Polyhedron Representation", *Stanford Artificial Intelligence Report,* No. CS–320, Oct. 1972.

Braid, I.C. et al., "Stepwise Construction of Polyhedra in Geometric Modeling", *Mathematical Methods in Computer Graphics and Design,* K.S. Brodlie editor, Academic Press, 1980.

Brown, A.R., "Interpretation of Three–Dimensional Seismic Data", 3rd Ed., *American Association of Petroleum Geologists,* Tulsa OK, 1986, pp. 67–104, 139–178.

Celniker, G. et al., "Deformable Curve and Surface Finite Elements for Free–Form Shape Design", *Computer Graphics,* vol. 25, No. 4, 1991.

Celniker, G. et al., "Visualization and Modeling of Geophysical Data", *Proceedings Visualization '93,* San Jose, CA, Oct. 25–29, 1993, pp. 362–365.

(List continued on next page.)

*Primary Examiner*—Donald E. McElheny, Jr.
*Attorney, Agent, or Firm*—Howard L. Speight

[57] ABSTRACT

A method, computer system and computer program for analyzing geological data sampled from a subsurface region stored in a geoscience model on a computer-readable media including defining consistency; detecting an inconsistency; and resolving the inconsistency.

111 Claims, 18 Drawing Sheets

OTHER PUBLICATIONS da Silva, R.E. et al., "An Algebraic Approach to Geometric Query Processing in CAD/CAM Applications", proceedings of *Symposium on Solid Modeling Foundations and CAD/CAM Applications,* Rossignac & Turner editors, Austin, TX, Feb. 22, 1991, pp. 73–86.

De Martino, T. et al., "Feature–based Modelling by Integrating Design and Recognition Approaches", *Computer–Aided Design,* vol. 26, No. 8, Aug. 1994, pp. 646–653.

Duan, W. et al., "FSMT: A Feature Solid–Modelling Tool for Feature–Based Design and Manufacture", *Computer–Aided Design,* vol. 25, No. 1, Jan., 1993, pp. 29–38.

Farin, G., "Curves and Surfaces for Computer Aided Geometric Design", *Academic Press,* 2d ed., New York, 1990, pp. 101–150.

*3D VSP–3D Vertical Seismic Profile Modeling,* http://www.gxt.com/productinfo/3dvspinfo.html, GX Technology Corporation, Houston, TX, no date.

Glassner, A.S., *Useful 3D Geometry,* Graphics Gems, Academic Press, ISBN 0–12–286165–5, no date, pp. 297–339, 485–571.

Heymans, M. et al., "Testing Hydrocarbon Saturation Models for Use in Original Oil–In–Place Estimation:, South Dome of Oregon Basin Field, Park County, Wyoming", *Computer Modeling of Geologic Surfaces and Volumes,* AAPG Computer Applications in Geology, No. 1, The American Association of Petroleum Geologists, no date, pp. 105–121.

Hughes, T.J.R., *The Finite Element Method—Linear, Static and Dynamic Finite Element Analysis,* Prentice Hall, Englewood Cliffs, N.J., 1987, pp. 1–56.

Laakko, T. et al., "Feature Modelling by Incremental Feature Recognition", *Computer–Aided Design,* vol. 25, No. 8, Aug. 1993, pp. 479–492.

Lorenson, W.E., et al., "Marching Cubes: A High Resolution 3D Surface Construction Algorithm", *Computer Graphics,* vol. 21, No. 4, Jul. 1987, pp. 163–169.

Lou, Y. et al., "A Boundary Representation for Form Features and Non–Manifold Solid Objects", Proceedings of *Symposium on Solid Modelling Foundations and CAD/CAm Applications,* Rossignac & Turner editors, Austin TX, Jun. 5–7, 1991, pp. 45–60.

Lovell, J., *Finite Element Methods in Resistivity Logging,* Ph.D. dissertation, Technical University Delft, 1993, pp. 1–18, 67–70, 170–176.

Millman, R.S. et al., *Elements of Differential Geometry,* Prentice Hall, Englewood Cliffs, N.J., 1977, pp. 173–242.

Munkres, J.R., *Elements of Algebraic Topology,* Benjamin/Cummings Publishing Co., Inc., Menlo Park, CA, 1984, pp. 1–128, 368–446.

Pratt, M.J., "Synthesis of an Optimal Approach to Form Feature Modelling", in *Proceedings of the ASME International Computers in Engineering Conference and Exhibition,* San Francisco, CA, Jul. 31–Aug. 4, 1988, pp. 263–274.

Shah, J.J. et al., "Feature–Based Modeling Shell. Design and Implementation", *Computers in Engineering,* pp. 255–261, Dept. of Mech. and Aerospace Eng., Arizona St. University, Tempe, AZ, 1988, pp. 255–261.

Simmons, R.G., "Representing and Reasoning About Change in Geologic Interpretation", *Technical Report 749,* MIT Artificial Intelligence Laboratory, Dec. 1983, pp. 6–21, 109–121.

Weiler, K.J., *Topological Structures for Geometric Modeling,* Ph.D. thesis, Rensselaer Polytechnic Institute, Troy, New York, Aug., 1986, pp. 31–41, 59–89, 118–147, 186–214.

Wyatt, K.D., et al., "Building Velocity–Depth Models for 3D Depth Migration", *The Leading Edge,* vol. 13, No. 8, Aug. 1994, pp. 862–866.

Teller, S. et al., "Partitioning and Ordering Large Radiosity Computations", *Computer Graphics Proceedings,* Annual Conference Series, 1994, pp. 443–450.

*Product Availability by Platform,* http://www.gxt.com/productinfo/platformlist.html#3daims, GX Technology Corporation, Houston, TX. No Date.

*Product Availability by Platform,* http://www.gxt.com/productinfo/productinfo.html, GX Technology Corporation, Houston, TX. No Date.

*Product Information* http://www.gxt.com/productinfo/productinfo.html, GX Technology Corporation, Houston, TX. No Date.

Bode, T. et al. "First experiences with Geostore, an information system for geologically defined geometries" IGIS '94: Geographic Information Systems, International Workshop on Advanced Research in Geographic Information Systems. ISBN 3–540–58795–0, 1994, Berlin, Springer–Verlag, Germany, pp. 35–44, XP002064462.

Jones, C.B. "Data structures for three–dimensional spatial information systems in geology," International Journal of Geographical Information Systems, Jan.–Mar. 1989, UK, vol. 3, No. 1, ISSN 0269–3798, pp. 15–31, XP002064461.

Raafat, Hazem M. "An extended relational database for remotely sensed image data management within GIS," IEEE Transactions on Geoscience and Remote Sensing, vol. 29, No. 4, Jul. 1991, New York, pp. 651–655, XP000258538.

Jesperson, S.K., et al., "Modeling of Received Signals from Interfaces of Arbitrary Geometry", *1995 IEEE Ultrasonics Symposium,* published Jul. 11, 1995, pp. 1561–1565.

Benediktsson, J.A., et al., "Classification and Feature Extraction of AVIRIS Data", *IEEE Transactions on Geoscience and Remote Sensing,* vol. 33, iss. 5, Sep. 1995, pp. 1194–1205.

Brown, P., "Collection and Quality Control of Marine Geological Data by the Ocean Drilling Program", *Oceans '88: A Partnership of Marine Interests,* 1988, pp. 1012–1017.

Duff, B.L., et al., "Applications of Object–Oriented Approaches to Expert Systems in the Earth Sciences", *Developing and Managing Expert System Programs,* 1991, pp. 160–165.

Roelofs, L.H., et al., "Applying Semantic Data Modeling Techniques to Large Mass Storage System Designs", *Mass Storage Systems, 1990 10th IEEE Symposium,* 1990, pp. 65–76.

Starks, S.A., et al., "Navigating Large Databases Using a New High–Level Computer Language", *Northcon/95* 1995, pp. 49–54.

Young, J.A., et al., "A Computer–Aided Geological Interpretation System for Subsurface Imaging", *Geoscience and Remote Sensing,* 1994 Symposium, pp. 854–856.

Zhou, Guan–Xiong, et al., "An Expert System for Pattern Recognition Based on Features and Knowledge", *Pattern Recognition, 1988 9th International Conference,* 1988, pp. 1239–1241.

Mallet, J.L., "GOCAD: A Computer–Aided Design Program for Geological Applications", Jun. 1989, pp. 1–37.

Mallet, J.L., "Discrete Smooth Interpolation in Geometric Modelling", *Computer–Aided Design,* vol. 24, No. 4, Apr. 1992, pp. 177–192.

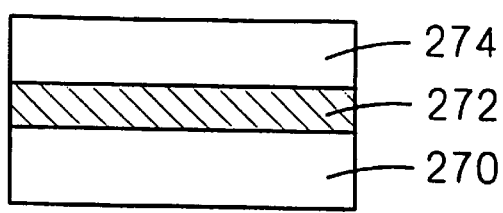
FIG. 15a
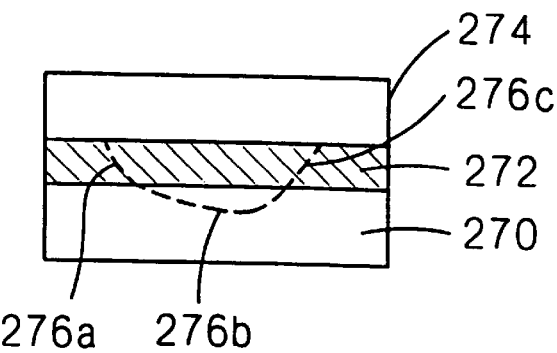
FIG. 15b
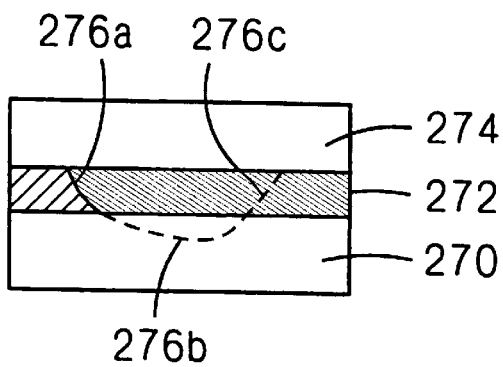
FIG. 15c
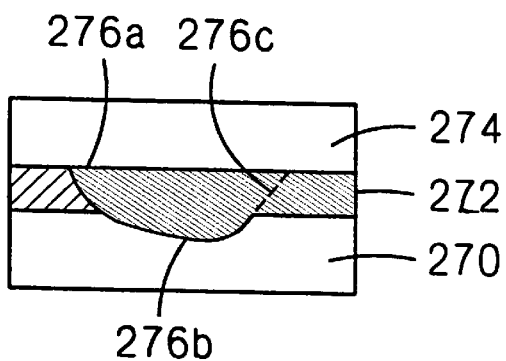
FIG. 15d
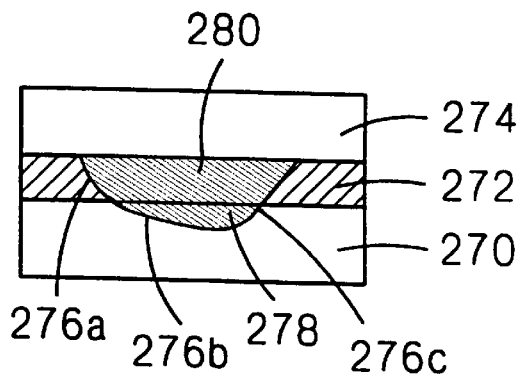
FIG. 15e
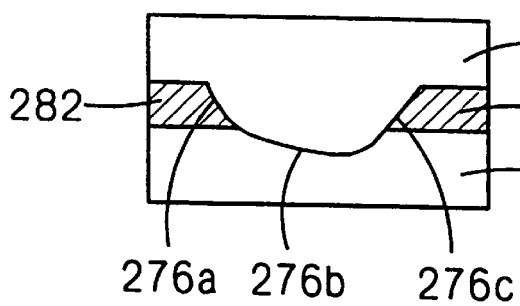
FIG. 15f
Inconsistent Region

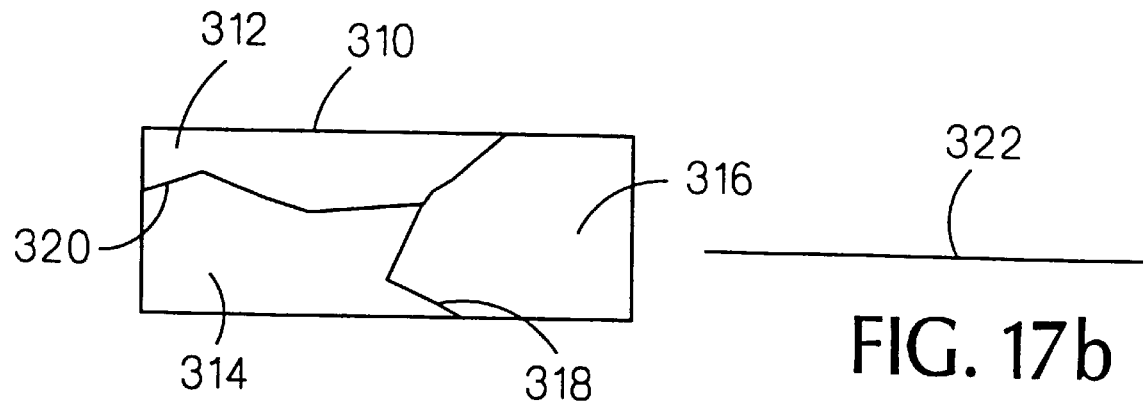
FIG. 17a
FIG. 17b
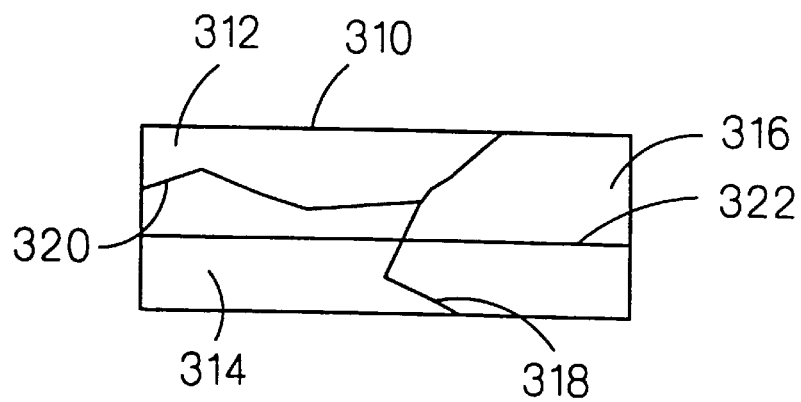
FIG. 17c
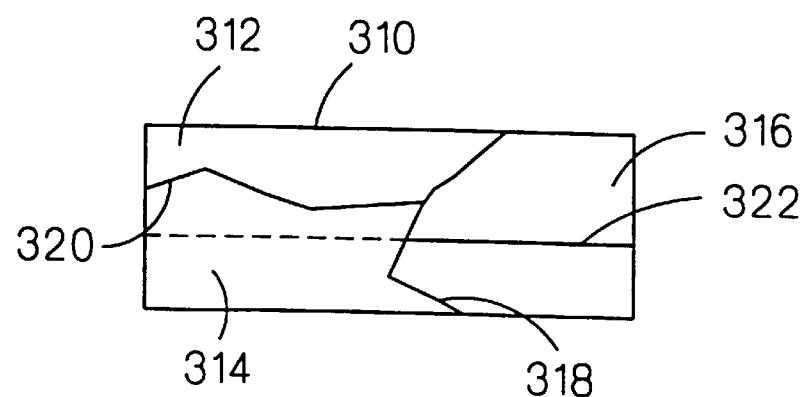
FIG. 17d

ENFORCING CONSISTENCY IN GEOSCIENCE MODELS

BACKGROUND

This invention relates to enforcing consistency in geoscience models.

Geologists, geophysicists and petroleum engineers use models, including computerized models, of the earth's shell to plan exploration and production of hydrocarbons and, to a lesser extent, other minerals. As hydrocarbons become more and more scarce, the accuracy of the computerized models becomes increasingly important to limiting the cost of locating and producing hydrocarbons and the associated cost of hydrocarbon products, such as gasoline and heating oil.

Interpretation of log data and seismic surveys produces a description of the structure and properties of rocks in the subsurface, as well as of their fluid and gas contents. Different measurements provide complimentary and overlapping information which has to be integrated to form a consistent model of the subsurface.

SUMMARY

In general, in one aspect, the invention features a method for analyzing geological data sampled from a subsurface region stored in a geoscience model on a computer-readable media comprising enforcing consistency within the geoscience model.

Implementations of the invention may include one or more of the following. Enforcing consistency may comprise applying rules. Enforcing consistency may comprise defining consistency. Enforcing consistency may comprise detecting inconsistency.

Detecting inconsistency may comprise detecting a seed inconsistency. Detecting inconsistency may comprise detecting a background inconsistency. Detecting inconsistency may comprise detecting a seed inconsistency when a seed is classified into a background. Detecting inconsistency may comprise detecting a background inconsistency when a seed is classified into a background. Detecting inconsistency may comprise detecting a potential inconsistency.

Enforcing consistency may comprise resolving inconsistency. Resolving inconsistency may comprise removing a portion of a seed from a topologically active part of the geoscience model. Resolving inconsistency may comprise removing a portion of a background from a topologically active part of the geoscience model. Resolving inconsistency may comprise changing a geometry of a seed. Resolving inconsistency may comprise changing a geometry of a portion of a background. Resolving inconsistency may comprise flagging an inconsistency for later resolution.

Detecting inconsistency may comprise detecting an embedded surface cell's age being outside the age range of a host layer for the embedded surface cell. Detecting inconsistency may comprise detecting a point in a subvolume having an age not within the range defined by the subvolume's bounding erosional or depositional surfaces. Detecting inconsistency may comprise detecting a bed boundary not connected to two or more distinct subvolumes. Detecting inconsistency may comprise detecting a horizon which terminates in a layer. Detecting inconsistency may comprise detecting a child subvolume having a volume less than a predefined percentage of the child subvolume's parent's volume. Detecting inconsistency may comprise detecting a ratio of a subvolume's volume to its surface being less than a predetermined amount. Detecting inconsistency may comprise detecting a first age assignment from a first horizon that is inconsistent with a second age assignment from a second horizon. Detecting inconsistency may comprise detecting a pinched-out layer. Detecting inconsistency may comprise detecting a layer forming lenses. Detecting inconsistency may comprise detecting a cell of a feature embedded into a sub-region where the feature is not allowed.

Resolving inconsistency may comprise asking how to extend the surface. Resolving inconsistency may comprise extending a horizon to a nearest surface bounding the layer. Resolving inconsistency may comprise extending a horizon to a geoscience model boundary. Resolving inconsistency may comprise removing a segment of a feature which extends into an unallowed sub-region. Resolving inconsistency may comprise identifying a horizon that contributes to the inconsistency; and removing a segment of the horizon that contributes to the inconsistency. Resolving inconsistency may comprise identifying a first horizon and a second horizon that contribute to the inconsistency; and reshaping the first horizon and the second horizon to maintain a distance between them that is greater than or equal to a preselected amount. Resolving inconsistency may comprise collapsing a small sub-region bounded by a horizon. Collapsing may comprise removing a portion of the horizon that bounds the small sub-region. Resolving inconsistency may comprise identifying a sub-region created by invalid horizons; and reshaping the invalid horizons to produce a correctly-shaped sub-region.

The method may further comprise blocking property updates.

In general, in another aspect, the invention features a method for analyzing geological data sampled from a subsurface region stored in a geoscience model on a computer-readable media comprising defining consistency; detecting an inconsistency; and resolving the inconsistency.

In general, in another aspect, the invention features a computer system for analyzing geological data sampled from a subsurface region stored in a geoscience model on a computer-readable media comprising means for enforcing consistency within the geoscience model.

Implementations of the invention may include one or more of the following. The enforcing consistency means may comprise means for applying rules. The enforcing consistency means may comprise means for defining consistency. The enforcing consistency means may comprise means for detecting inconsistency. The detecting inconsistency means may comprise means for detecting a seed inconsistency. The detecting inconsistency means may comprise means for detecting a background inconsistency. The detecting inconsistency means may comprise means for detecting a seed inconsistency when a seed is classified into a background. The detecting inconsistency means may comprise means for detecting a background inconsistency when a seed is classified into a background. The detecting inconsistency means may comprise means for detecting a potential inconsistency.

The enforcing consistency means may comprise means for resolving inconsistency.

The resolving inconsistency means may comprise means for removing a portion of a seed from a topologically active part of the geoscience model. The resolving inconsistency means may comprise means for removing a portion of a background from a topologically active part of the geoscience model. The resolving inconsistency means may comprise means for changing a geometry of a seed. The resolving inconsistency means may comprise means for changing a geometry of a portion of a background. The resolving inconsistency means may comprise means for flagging an inconsistency for later resolution.

The detecting inconsistency means may comprise means for detecting an embedded surface cell's age being outside the age range of a host layer for the embedded surface cell. The detecting inconsistency means may comprise means for detecting a point in a subvolume having an age not within the range defined by the subvolume's bounding erosional or depositional surfaces. The detecting inconsistency means may comprise means for detecting a bed boundary not connected to a two or more distinct subvolumes. The detecting inconsistency means may comprise means for detecting a horizon which terminates in a layer. The detecting inconsistency means may comprise means for detecting a child subvolume having a volume less than a predefined percentage of the child subvolume's parent's volume. The detecting inconsistency means may comprise means for detecting a ratio of a subvolume's volume to its surface being less than a predetermined amount. The detecting inconsistency means may comprise means for detecting a first age assignment from a first horizon that is inconsistent with a second age assignment from a second horizon. The detecting inconsistency means may comprise means for detecting a pinched-out layer. The detecting inconsistency means may comprise means for detecting a layer forming lenses. The detecting inconsistency means may comprise means for detecting a cell of a feature embedded into a sub-region where the feature is not allowed.

The resolving inconsistency means may comprise means for asking how to extend the surface. The resolving inconsistency means may comprise means for extending a horizon to a nearest surface bounding the layer. The resolving inconsistency means may comprise means for extending a horizon to a geoscience model boundary. The resolving inconsistency means may comprise means for removing a segment of a feature which extends into an unallowed sub-region. The resolving inconsistency means may comprise means for identifying a horizon that contributes to the inconsistency; and means for removing a segment of the horizon that contributes to the inconsistency. The resolving inconsistency means may comprise means for identifying a first horizon and a second horizon that contribute to the inconsistency; and means for reshaping the first horizon and the second horizon to maintain a distance between them that is greater than or equal to a preselected amount. The resolving inconsistency means may comprise means for collapsing a small sub-region bounded by a horizon. The collapsing means may comprise means for removing a portion of the horizon that bounds the small sub-region. The resolving inconsistency means may comprise means for identifying a sub-region created by invalid horizons; and means for reshaping the invalid horizons to produce a correctly-shaped sub-region.

The computer system may further comprise means for blocking property updates.

In general, in another aspect, the invention features a computer system for analyzing geological data sampled from a subsurface region stored in a geoscience model on a computer-readable media comprising means for defining consistency; means for detecting an inconsistency; and means for resolving the inconsistency.

In general, in another aspect, the invention features a computer program, residing on a computer-readable medium, for analyzing geological data sampled from a subsurface region stored in a geoscience model on a computer-readable media comprising instructions for causing the computer to enforce consistency within the geoscience model.

Implementations of the invention may include one or more of the following. The instructions for causing the computer to enforce consistency may comprise instructions for causing the computer to apply rules. The instructions for causing the computer to enforce consistency may comprise instructions for causing the computer to define consistency. The instructions for causing the computer to enforce consistency may comprise instructions for causing the computer to detect inconsistency.

The instructions for causing the computer to detect inconsistency may comprise instructions for causing the computer to detect a seed inconsistency. The instructions for causing the computer to detect inconsistency may comprise instructions for causing the computer to detect a background inconsistency. The instructions for causing the computer to detect inconsistency may comprise instructions for causing the computer to detect a seed inconsistency when a seed is classified into a background. The instructions for causing the computer to detect inconsistency may comprise instructions for causing the computer to detect a background inconsistency when a seed is classified into a background. The instructions for causing the computer to detect inconsistency may comprise instructions for causing the computer to detect a potential inconsistency.

The instructions for causing the computer to enforce consistency may comprise instructions for causing the computer to resolve inconsistency.

The instructions for causing the computer to resolve inconsistency may comprise instructions for causing the computer to remove a portion of a seed from a topologically active part of the geoscience model. The instructions for causing the computer to resolve inconsistency may comprise instructions for causing the computer to remove a portion of a background from a topologically active part of the geoscience model. The instructions for causing the computer to resolve inconsistency may comprise instructions for causing the computer to change a geometry of a seed. The instructions for causing the computer to resolve inconsistency may comprise instructions for causing the computer to change a geometry of a portion of a background. The instructions for causing the computer to resolve inconsistency may comprise instructions for causing the computer to flag an inconsistency for later resolution.

The instructions for causing the computer to detect inconsistency may comprise instructions for causing the computer to detect an embedded surface cell's age being outside the age range of a host layer for the embedded surface cell. The instructions for causing the computer to detect inconsistency may comprise instructions for causing the computer to detect a point in a subvolume having an age not within the range defined by the subvolume's bounding erosional or depositional surfaces. The instructions for causing the computer to detect inconsistency may comprise instructions for causing the computer to detect a bed boundary not connected to a two or more distinct subvolumes. The instructions for causing the computer to detect inconsistency may comprise instructions for causing the computer to detect a horizon which terminates in a layer. The instructions for causing the computer to detect inconsistency may comprise instructions for causing the computer to detect a child subvolume having a volume less than a predefined percentage of the child subvolume's parent's volume. The instructions for causing the computer to detect inconsistency may comprise instructions for causing the computer to detect a ratio of a subvolume's volume to its surface being less than a predetermined amount. The instructions for causing the computer to detect inconsistency may comprise instructions for causing the computer to detect a first age assignment from a first horizon that is inconsistent with a second age assignment from a second horizon. The instructions for causing the computer to detect inconsistency may comprise instructions for causing the computer to detect a pinched-out layer. The instructions for causing the computer to detect inconsistency may comprise instructions for causing the computer to detect a layer forming lenses. The instructions for causing the computer to detect inconsistency may comprise instructions for causing the computer to detect a cell of a feature embedded into a sub-region where the feature is not allowed.

The instructions for causing the computer to resolve inconsistency may comprise instructions for causing the computer to ask how to extend the surface. The instructions for causing the computer to resolve inconsistency may comprise instructions for causing the computer to extend a horizon to a nearest surface bounding the layer. The instructions for causing the computer to resolve inconsistency may comprise instructions for causing the computer to extend a horizon to a geoscience model boundary. The instructions for causing the computer to resolve inconsistency may comprise instructions for causing the computer to remove a segment of a feature which extends into an unallowed sub-region. The instructions for causing the computer to resolve inconsistency may comprise instructions for causing the computer to identify a horizon that contributes to the inconsistency; and instructions for causing the computer to remove a segment of the horizon that contributes to the inconsistency. The instructions for causing the computer to resolve inconsistency may comprise instructions for causing the computer to identify a first horizon and a second horizon that contribute to the inconsistency; and instructions for causing the computer to reshape the first horizon and the second horizon to maintain a distance between them that is greater than or equal to a preselected amount. The instructions for causing the computer to resolve inconsistency may comprise instructions for causing the computer to collapse a small sub-region bounded by a horizon. The instructions for causing the computer to collapse the small sub-region may comprise instructions for causing the computer to remove a portion of the horizon that bounds the small sub-region. The instructions for causing the computer to resolve inconsistency may comprise instructions for causing the computer to identify a sub-region created by invalid horizons; and instructions for causing the computer to reshape the invalid horizons to produce a correctly-shaped sub-region.

The computer program may comprise instructions for causing the computer to block property updates.

In general, in another aspect, the invention features a computer program, residing on a computer-readable medium, for analyzing geological data sampled from a subsurface region stored in a geoscience model on a computer-readable media comprising instructions for causing the computer to define consistency; detect an inconsistency; and resolve the inconsistency.

BRIEF DESCRIPTION OF THE DRAWINGS

FIGS. 2a–c, 3a–c, 4a–c, 5a–c, 6a–c, 7a–c, 8a–e, 9a–b, 10a–b, 11a–b, 12a–b, 13a–b, 14a–c, 15a–f, 16a–c, and 17a–d are examples of items to be modeled.

Simulations may be used to verify interpretations, an approach which is called simulation-based interpretation ("SBI"), described in co-pending patent application Ser. No. 08/770,209, entitled "Performing Geoscience Interpretation with Simulated Data", respectively, incorporated by reference.

Figure 1:
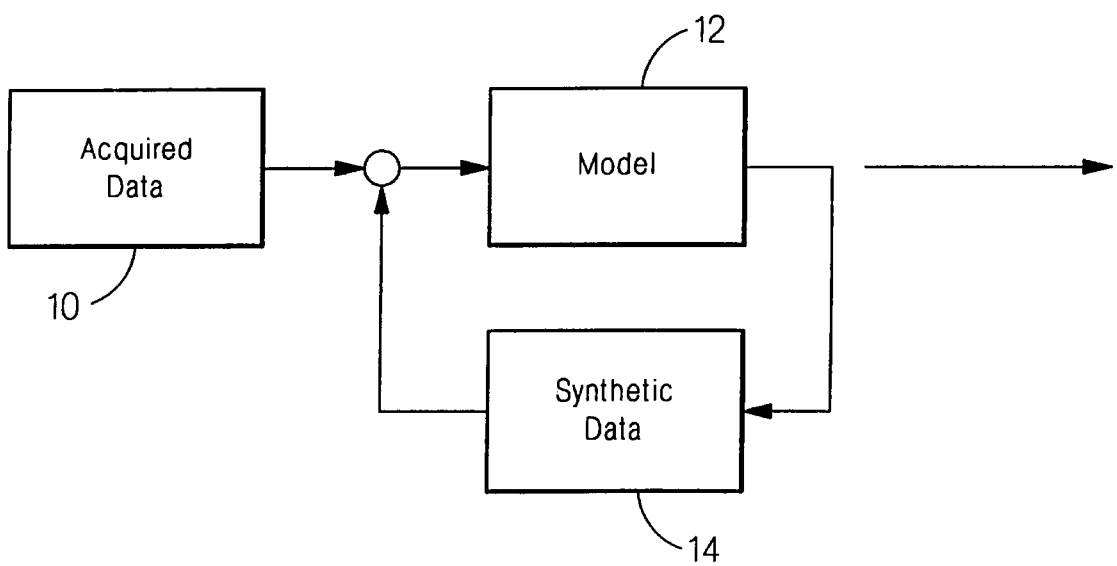
FIG. 1 is a block diagram.

Simulation-based interpretation, illustrated in FIG. 1, begins by gathering acquired data 10 from the geological structures being modeled. The acquired data is interpreted, and the resulting interpretation is captured as a geoscience model 12. The model is then tested by simulating the original acquisition experiment to produce synthetic data 14. Differences between the synthetic data 14 and the acquired data 10 are determined and used to adjust the model. Repeated iterations of these steps may cause a model to converge toward a consistent model in which the differences between the synthetic and the acquired data are reduced.

Building 3D geometric models of geological structures is not easy because it involves modeling irregular shapes with complex spatial relationships. Irregular Space Partition (ISP) modeling represents geological bodies and their spatial relationships and defines a region of interest whose internal structure is built from surfaces such as horizons and faults that subdivide the region of interest and form sub-regions (such as geologic layer 20a, 20b shown in FIG. 2a). The notion of a region is independent of dimension; a 3D region is a solid object, a 2D region is an area, etc. An ISP model explicitly stores the spatial relationships of all the subregions contained in it.

An extension to ISP modeling, feature-based modeling, makes it possible to define geometric objects ("features" that consist of one or more pieces that do not have to be topologically connected. For example, all the features in FIG. 2a such as horizon 22a, 26b, 26c, horizon 24a, 24b, both faulted by faults 26 and 28, and layer 20a, 20b, disconnected by fault 28, are treated as single objects, even though they are disconnected.

A wide variety of measurements, processing methods and simulations can create a model that accurately describes a subsurface region. This model can describe a geometry of subsurface structures, a topology relationship among their components, and material properties of subsurface regions such as layers and reservoir compartments. The model may be general and sharable by different applications. Since subsurface structures can be large and complex, the model may support automated, high-level model editing.

Figure 2A:
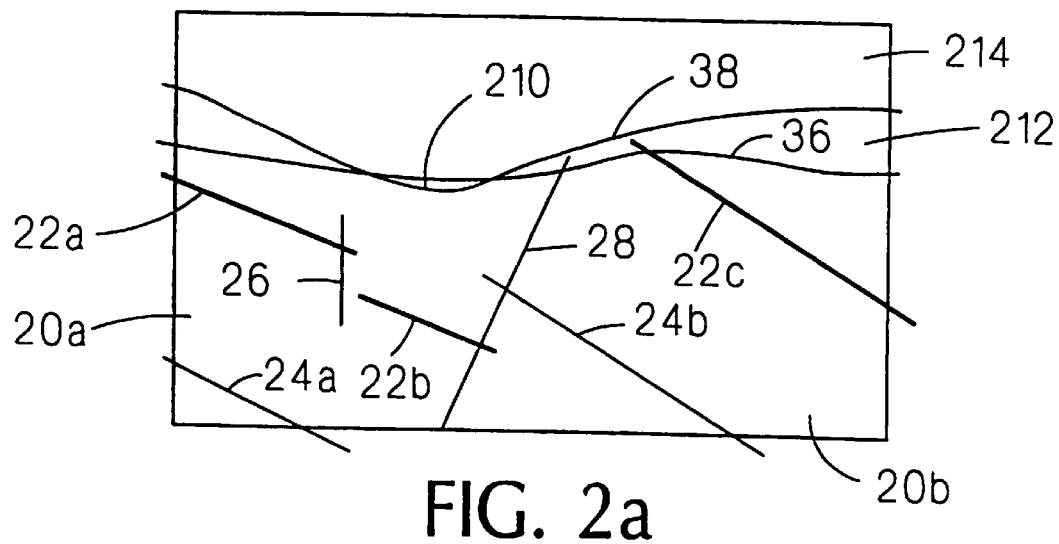
Figure 2B:
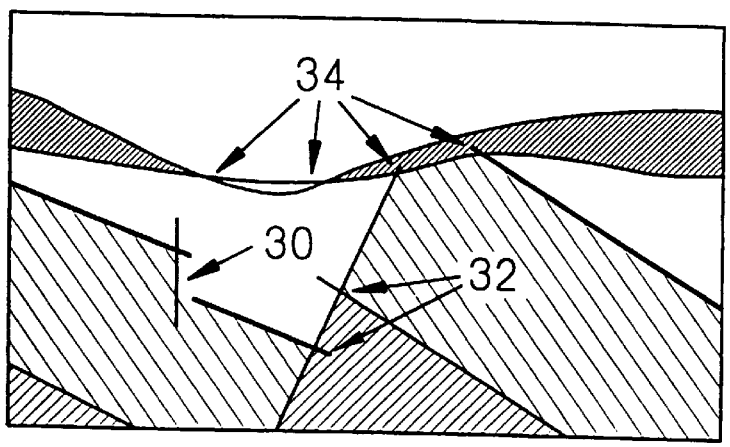

Building three-dimensional geometric models of geological structures is complicated by the fact that input geometry is used to build a geoscience model are frequently not "clean." For example, as shown in FIG. 2b, fault ties, which are intersections of horizons and faults, may be missing 30, horizons may cross faults 32, or horizons may penetrate each other 34.

The stratigraphic and structural characteristics of specific features are often known. For example, it may be known that fault 28 in FIG. 2a truncates and offsets horizon 22a, 26b, 22c and horizon 24a, 24b, which are older. It may be known that fault 28 is in turn truncated by the younger erosional contact 36. It may also be known that horizon 22a, 26b, 22c and horizon 24a, 24b separate younger layers above from older layers below. Additionally, it may be known that the layer between erosional contact 36 and another erosional contact 38 has a certain minimal thickness.

Exploiting such characteristics can help applications to automatically build correct, clean models or to check an interpretation for consistency. When building irregular spaced partition models of geological structures, three geometrical conditions are encountered that create inconsistencies, as shown in FIGS. 2a and 2b. Generally, the three types of inconsistencies are shape, material property, and topology inconsistencies. The inconsistencies can occur in the seed and in the background (both terms are defined below).

Figure 2C:
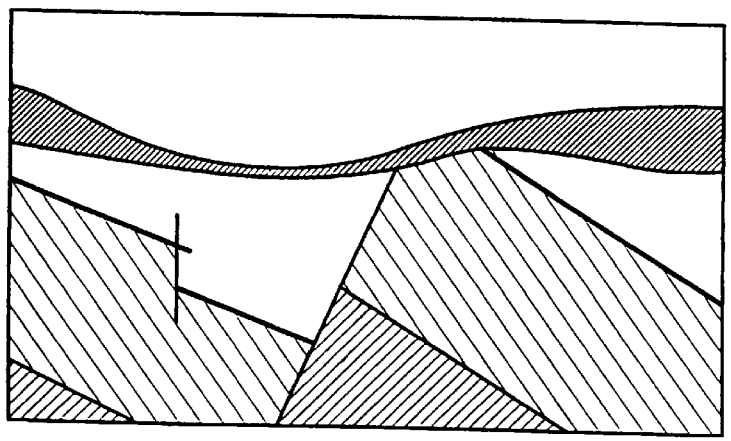

A geometric component can be too large, such as horizon segment 22a, too short, such as horizon segment 22b (with respect to fault 26), or have the wrong shape, such as erosion contacts 36 and 38. Components that are too large can also be considered to contain excessive pieces, such as the piece of horizon segment 22a extending to the right of fault segment 26. Since it cannot be determined by geometrical analysis only whether or not those conditions constitute an error, additional constraints are necessary to express the structure that is intended to be built. The rule system uses these additional constraints to automatically build correct, clean models such as that depicted in FIG. 2c.

The formulation of a geological rule requires the analysis of whether to constrain the shape, the topological relationships, the attributes of an object, or a combination of all three. The system separates the representations of shape, topology, and properties of geometric objects for flexibility and to make extensions straightforward.

Shapes can comprise any of a combination of geometry primitives including lines, planes, free-form surfaces, and 3D solids. The shape of a geometry primitive is defined to be the set of points it occupies in space. The primary surface shapes used to build geological models are represented by grids and triangle meshes.

Parametric shape representations may be used to provide a wide range of different shapes. A parametric shape representation is provided by a parametric equation which maps variables in parameter space to image space. For example, consider a regularly gridded surface of N by M nodes with a spacing of d in both directions, and node (0,0) located at [x0, y0, f(0,0)]. The surface's shape is the set of points given by the function:

x=x0+n d
y=y0+m d
z=f(0,0)

where n and m are parameters defined in the range from 0 to N and 0 to M, respectively, and f(n,m) is the value of z at node (n,m).

These equations define the mapping from a parameter space where n and m are defined, to the image space where [x, y, z] coordinates are defined. For every (n,m)-pair there is a unique value of [x, y, z]. If a continuous interpolation function is defined to obtain z-values for fractional values of n and m, the surface number of points on the surface is infinite and the surface is within its boundaries everywhere defined.

Figure 3B:
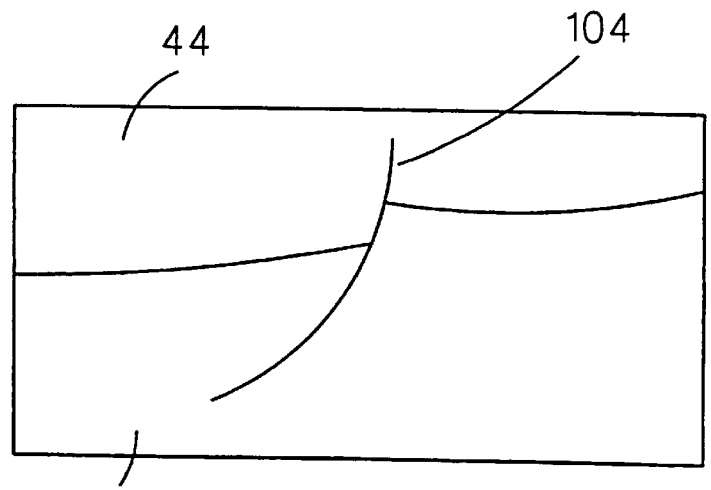
Figure 3A:
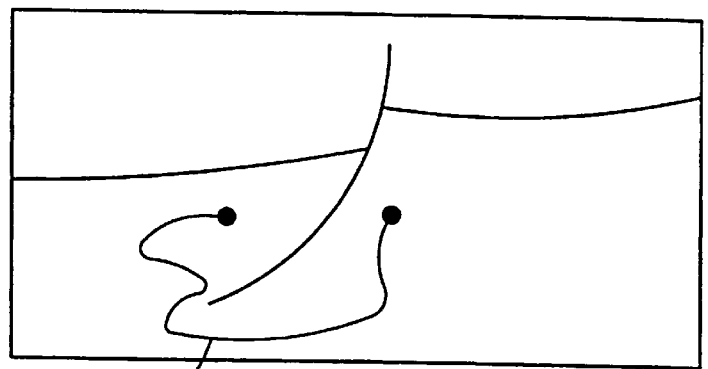
Figure 3C:
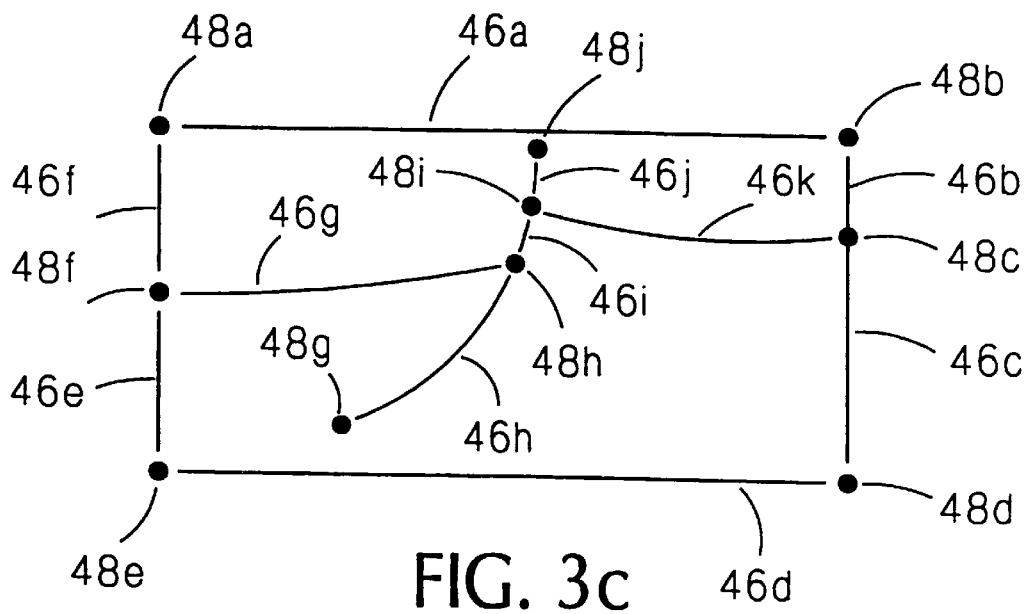

Topology, at a low level, includes representations within a geometric model of a collection of 0- to 3-dimensional objects (points, curves, surfaces, and volumes), called cells, whose topological relationships are explicitly represented. FIGS. 3a–c depict the concept of a cell.

A cell is defined as a closed but not necessarily bounded path-connected region of fixed dimension. A region is closed if its point set encloses its boundaries. A region is bounded if it is of finite extent. Path-connected means that any two points in a region can be connected by a path of finite length which never leaves the region, as shown by path 40 in FIG. 3a. The fixed dimension restriction implies a cell is a surface or a volume, but is not a surface plus a volume. A surface embedded in a volume is a set of two cells. As a point-set, two distinct cells can overlap along a common boundary or not at all.

In FIG. 3b areas 42 and 44 are distinct cells, as are the line segments between intersection points 46a–k, as are the intersection points 48a–j, as shown in FIG. 3c. The information associated with the cells of a geometric model fully describe the model's geometry and topology. Consequently, the geometric model is itself represented as a cellular model.

Figure 4A:
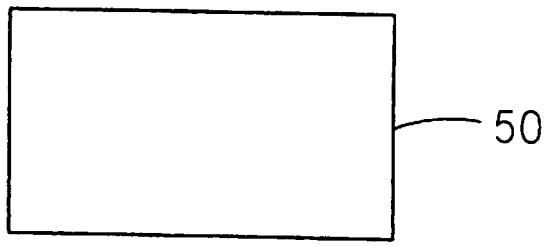
Figure 4B:
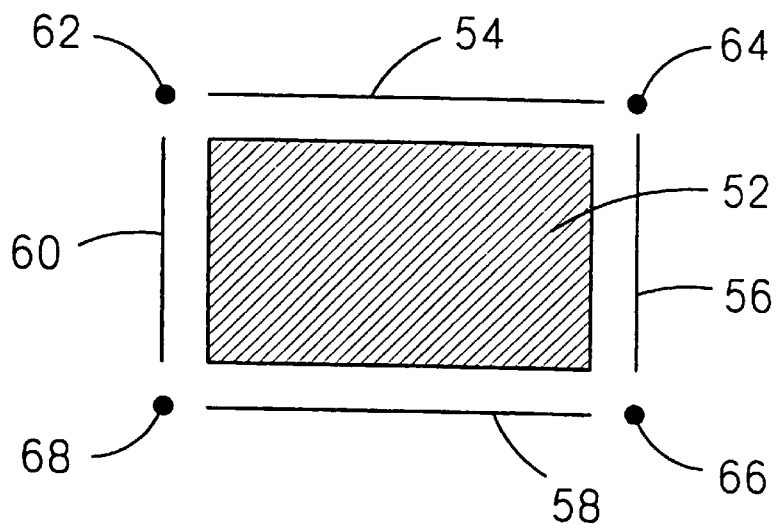
Figure 4C:
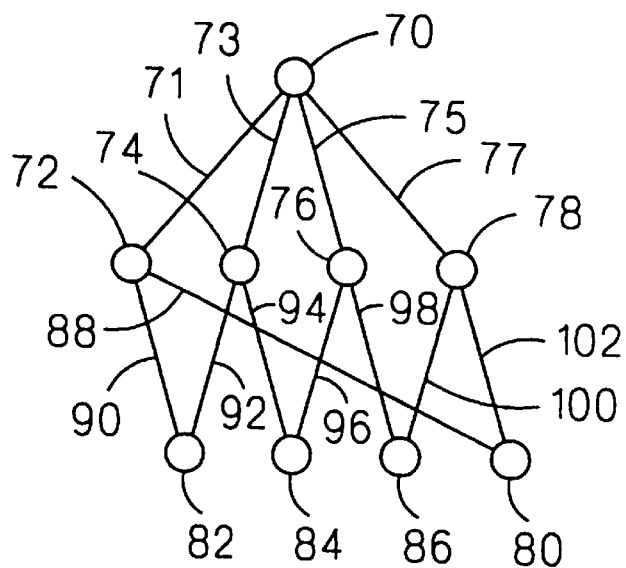

The topology of a geometric model is the set of all cell-cell connectivity relationships. These can be represented in a graph in which the arcs of the graphs represent connectivity and the nodes represent cells, as shown in FIGS. 4a–c. Box 50, shown in FIG. 4a, comprises two dimensional cell 52, one dimensional cells 54, 56, 58, and 60, and zero dimensional cells 62, 64, 66, and 68, as shown in FIG. 4b.

In a cellular model, cells can have two roles: as a boundary of a region of higher dimension; and as a region of higher dimension bounded by cells of lower dimension. Cells of dimension n are connected to cells of dimension less than n and vice versa. Most frequently, n-dimensional cells are bounded by cells having dimension n-1. It is possible for n-dimensional cells to be connected to cells of dimension less than n-1 (e.g., a borehole represented as a one-dimensional curve in a three-dimensional volume). In a topology graph, illustrated in FIG. 4c, cells are represented by circles and connections between cells are represented by arcs. Three dimensional cell 52, represented by circle 70, is connected to one dimensional cells 54, 56, 58, and 60, represented by circles 72, 74, 76, and 78, respectively. The connection is represented by arcs 71, 73, 75, and 77. One dimensional cell 54 is connected to zero dimensional cells 62 and 64, represented by circles 80 and 82, respectively. The connections are represented by arcs 88 and 90. One dimensional cell 56 is connected to zero dimensional cells 64 and 66, represented by circles 82 and 84, respectively. The connections are represented by arcs 92 and 94. One dimensional cell 58 is connected to zero dimensional cells 66 and 68, represented by circles 84 and 86, respectively. The connections are represented by arcs 96 and 98. One dimensional cell 60 is connected to zero dimensional cells 68 and 62, represented by circles 86 and 80, respectively. The connections are represented by arcs 100 and 102.

The most frequent representation in ISP models for boundary relationships for geological cells is that: endpoints bound curves; curves bound surfaces; and surfaces bound subvolumes. For example, a surface can bound a subvolume, but can itself be bounded by a set of curves. The one dimensional cells 54, 56, 58 and 60 in FIG. 4b are both subregions, bounded by points 62, 64, 66, and 68, and boundaries of subregion 52. Cells that are contained in higher-dimensional cells but do not split them, such as fault 104 in FIG. 3b, are said to be "embedded."

The operation of combining two geometric objects is called classification. Each geometric object is represented by a set of connected cells, called a cell complex. As the cell complexes are classified against each other, new cells may be generated by splitting existing cells.

Classification is executed in four steps: (1) compute intersections of shapes and generate cells representing the intersection geometries (such as the intersection points in FIG. 3c); (2) embed lower-dimensional cells of complex 1 in the higher-dimensional cells of complex 2 that they overlap; (3) split cells that are subdivided by lower-dimensional cells; (4) update the material properties of all affected cells (material properties are discussed below).

Figure 5A:
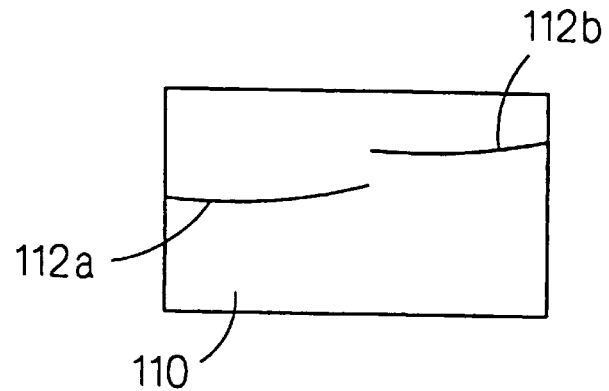
Figure 5B:
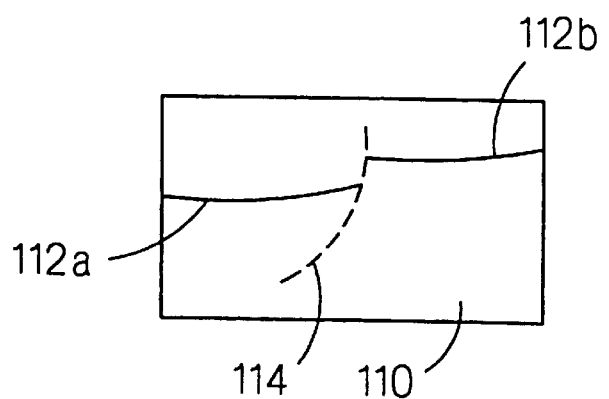
Figure 5C:
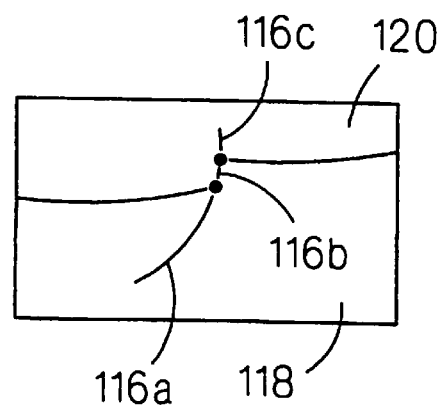

For example, assume an earth model contains a layer 110 and a faulted horizon 112a, 112b, as shown in FIGS. 5a–c. Initially, there is only one layer in the model because the bed boundary geometry with its gap does not subdivide layer 110. During classification, a fault 114 first gets split by horizon cells 112a and 112b, as shown in FIG. 5b, after which fault cells 116a, 116b, 116c get embedded in layer 110, as shown in FIG. 5c. Then layer 110 is split into layers 118 and 120, as shown in FIG. 5c. Fault cells 116a and 116c are embedded into layers 118 and 120, respectively. Embedding of fault 116a, 116b, 116c into layer 110 occurs prior to splitting.

Classification is discussed in detail in co-pending application Ser. No. 08/772,082, entitled "Modeling Geological Structures and Properties", incorporated by reference.

Attributes, or properties, are assigned to topological entities in a cellular model, where topological entities correspond to nodes or arcs in the model's topology graph. One topological entity can be assigned multiple properties.

While the primary use of the property system is to handle material properties, other properties such as geological age can be represented equally well. The property system has four important concepts.

First, properties can be tied to features and cells and other geometric entities.

Second, property representations can be arbitrarily chosen to be constant values, pointers to sets of values, or pointers to functions. Those functions typically take a point either in parameter space or in image space and return a material property value. Alternatively, they can return a property gradient or some other derived value.

Figure 6A:
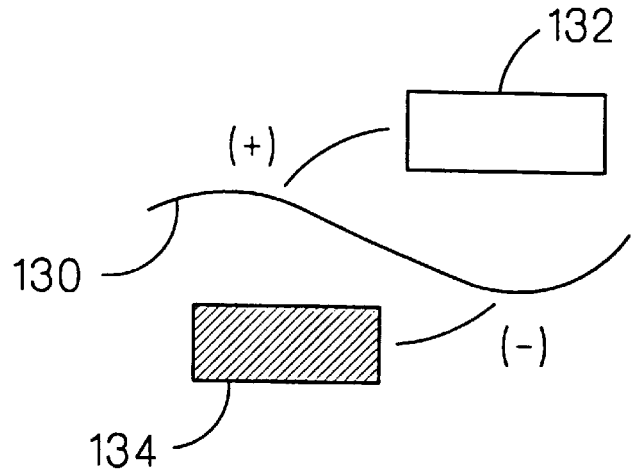

Third, properties can be oriented. A surface in 3-space, for example, can have different properties on either side. In FIG. 6a, for example, a surface 130 in 3-space is shown with two different material properties 132 and 134, one for each side of the surface.

Figure 6B:
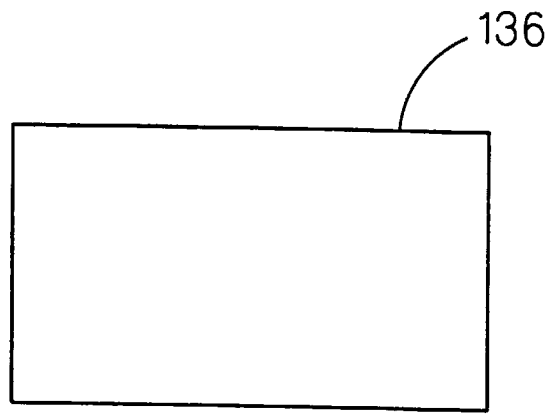
Figure 6C:
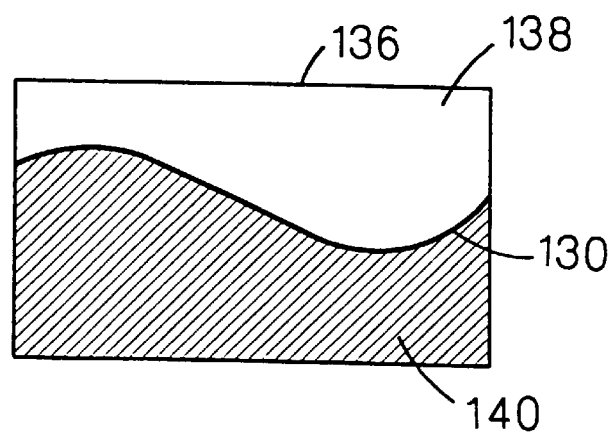

Fourth, changes to a model's topology graph (called "events" trigger functions (called "event callbacks") that can alter property assignments. Typical events include splitting and merging cells, and embedding of lower dimensional cells. In FIGS. 6a–c, as the surface 130 is inserted into a volume 136, the volume 136 is subdivided, its 3D cell is split, and two new subregions 138 and 140 are created. In this example, a split event callback propagates the curve's oriented material properties to the appropriate subregions. Consequently, the sub-region 138 above the curve takes the material property 132 associated with the top of the surface and the sub-region below the surface 140 takes the material property 134 associated with the bottom of the surface.

An application is able to keep a model's material properties assigned correctly during classification because the callback mechanism notifies the application each time a cell with a material property changes its topological state. Material property representations are discussed in detail in co-pending application Ser. No. 08/772,082, entitled "Modeling Geological Structures and Properties", incorporated by reference.

While cellular models can represent geometries of arbitrary complexity, it is cumbersome to build and edit them, and to keep track of material property assignments as cells are added, split, merged, and deleted as side effects of geometric operations. Cellular modeling is extended with the concept of features.

Features can be thought of as groups of one or more cells with a number of important conceptual properties (among others; see co-pending application Ser. No. 08/772,082, entitled "Modeling Geological Structures and Properties", incorporated by reference, for a full discussion of features).

Figure 7A:
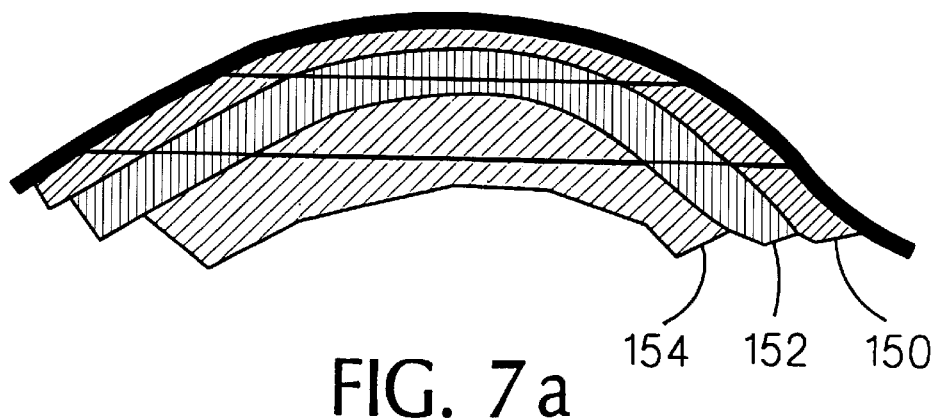
Figure 7B:
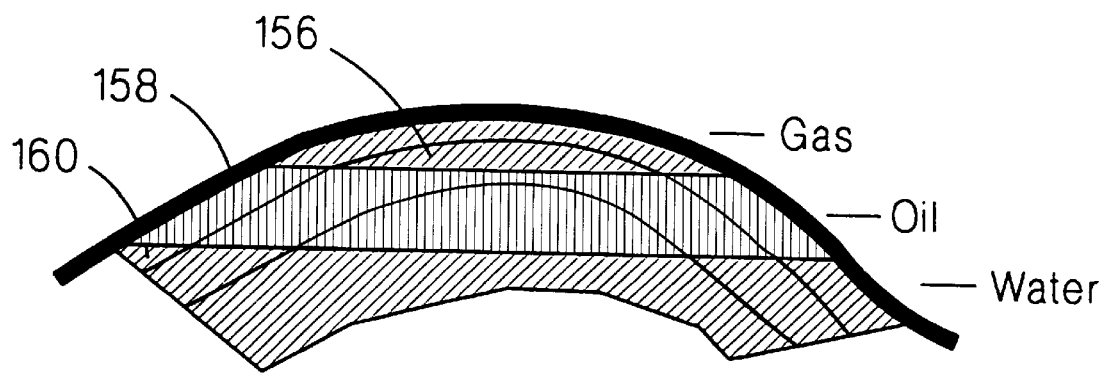
Figure 7C:
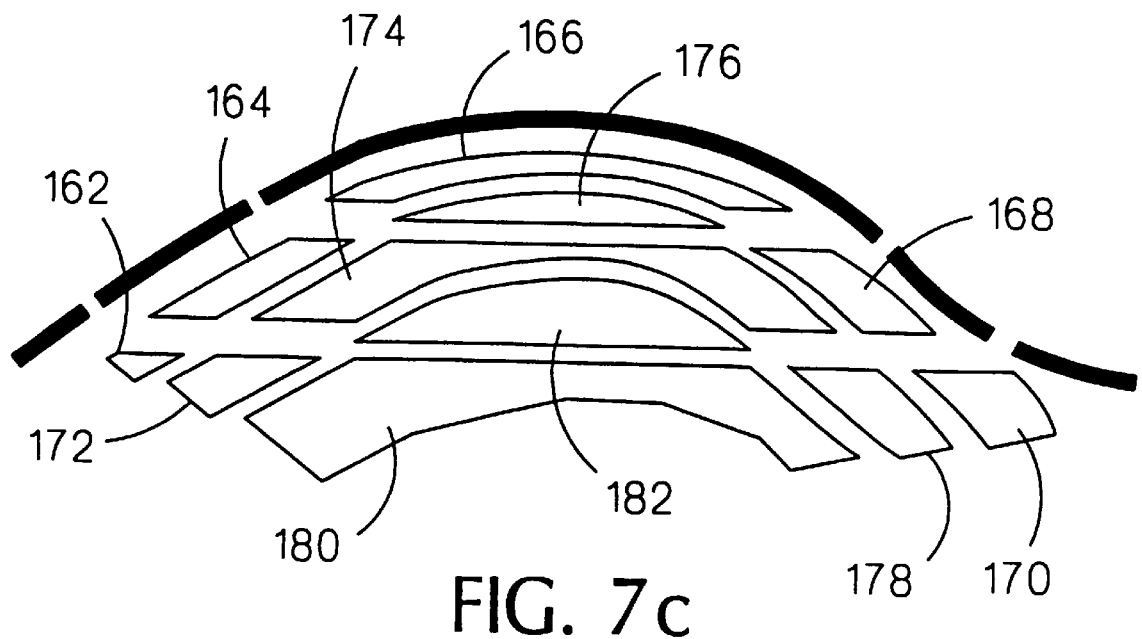

First, features preserve their point-set. The bed features 150, 152, and 154, shown in FIG. 7a, each continue to represent their entire respective beds although the gas, oil, and water layers 156, 158, and 160 have split feature 150 into five cells 162, 164, 166, 168, and 170, feature 152 into four cells 172, 174, 176 and 178, and feature 154 into two cells 180, 182, as shown in FIGS. 7b and 7c.

Second, a feature may be discontinuous, that is, a feature may contain unconnected cells. For example, layer feature 20a and 20b in FIG. 2a comprises two unconnected cells 20a and 20b.

Third, features may overlap as point sets. Individual cells may belong to more than one feature. For example, bed feature 150's cells, shown in FIG. 7c, also belong to the water, oil, and gas features 156, 158, and 160.

Fourth, features can carry properties that are inherited by their cells. What properties a cell has depends on the context in which its properties are evaluated.

Fifth, features can have 'active' and 'inactive' cells. Active cells can change their connectivity whereas inactive cells cannot. When features are combined to form a larger geometric model, only their active cells change topological state. Inactive cells are created as parts of features and are trimmed off, i.e., removed from the active part of the model, during model building. An application of this mechanism is the modeling of eroded horizons (often referred to as "ghost surfaces") and layers.

Sixth, a model may contain active and inactive features. Features are active by default and may contain active and inactive cells. Certain operations, such as dissociating a feature from a model, make a feature inactive. Inactive features only contain inactive cells, some of which may be copies of active cells. Inactive features cannot change their connectivity.

Rule based modeling is an extension of feature-based modeling.

Feature-based modeling can represent the inconsistencies that are generated when constructing a geometric model but cannot automatically report or resolve them. Structurally correct geological models are automatically built by exploiting rules based on feature properties.

The properties and structural characteristics of a feature can be translated into specifications that state which values of feature properties and which spatial relationships between features are considered correct. Such specifications are called rules. Rules apply to properties such as formation age or whether a surface represents a bed boundary or a fault.

Organizationally, a rule consists of a detection method and a resolution method. The detection method's task is to recognize when an inconsistency has arisen. The resolution method's task is to remove the inconsistency, to instruct the system how to remove the inconsistency, or to report the inconsistency to the application. Detection is automatic, in the sense that application-provided detection methods are invoked at the appropriate time to verify consistency. Resolution is performed at the conclusion of the operation giving rise to the violations, in the sense that the detection method calls a specific resolution method to resolve a particular violation. In certain cases, resolution may require complex human input, e.g. instructions on how to tie a bed boundary to a fault.

Figure 8A:
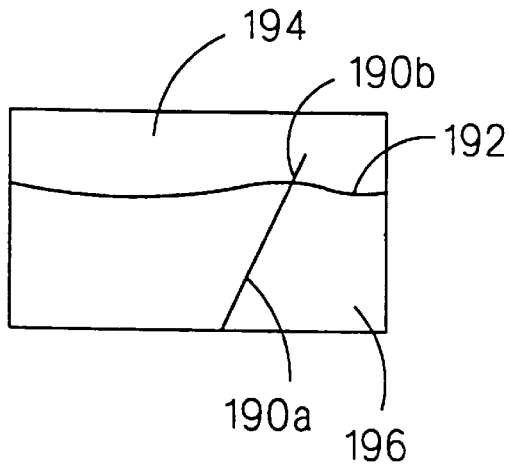

For example, when a fault 190a, 190b is classified, it should be truncated by an erosional surface 192, as shown in FIG. 8a. Instead, the fault extends across the erosional surface. An application may assign the following rule to each subvolume:

Formation age rule (detection): The age of any point in a subvolume is bounded above and below by the age of the erosional or depositional surfaces that bound the subvolume.

Formation age rule (resolution): Remove any surface cell violating the age bound.

Figure 8B:
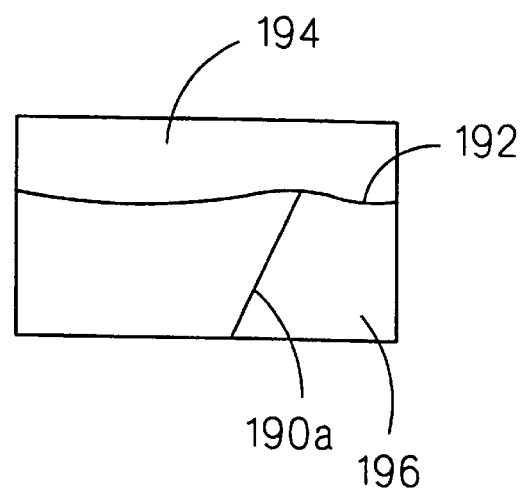

Assume that all points along erosional surface 192 are of fixed age e. Suppose fault 190*a*, 190*b* is of constant age f and that f>e, i.e., that the fault is older than the erosional surface. During classification, the fault will be split along erosional surface 192 into fault cells 190*a* and 190*b*. The splitting does not affect the age assignment, so both parts are of age f. An inconsistency occurs with respect to the embedding of fault cell 190*b* in the upper subvolume 194, because the age of the fault is greater than the age of the erosional layer, which is in turn greater than the age of layer 194. Thus, the age of fault cell 190*b* is greater than the age of layer 194, which violates the formation age rule. In contrast, fault cell 190*a*'s embedding in layer 196 is consistent because the age of the fault is greater than the age of the erosional surface and the age of layer 196 is greater than or equal to the age of the erosional surface. Following the rule's resolution strategy the inconsistency is resolved by removing fault segment 190*b* from the model as shown in FIG. 8*b*.

Figure 8C:
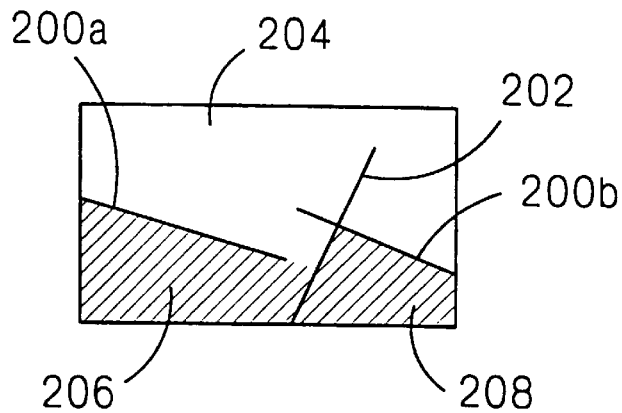

Inconsistent structural properties can also be detected and resolved, as shown in FIG. 8*c* (here, the age relationships are assumed to be everywhere consistent). Horizon 200*a*, 200*b* is offset by fault 202 but the horizon and fault geometries do not match exactly. Specifically, there is a gap between horizon cell 200*a* and fault 202 and horizon cell 200*b* crosses fault 202. The corresponding connectivity rule is defined as follows.

Connectivity rule (detection): A bed boundary must be connected to distinct subvolumes.

Connectivity rule (resolution): Ask how to extend the surface to subdivide the subvolume containing it.

Since horizon 200*a*, 200*b* is a bed boundary, each piece of it should separate two subregions. Horizon cell 200*a* should separate subregions 204 and 206 and horizon cell 200*b* should separate subregions 204 and 208. Horizon cells 200*a* and 200*b* each create an inconsistency, because each fails to subdivide the model. Note that although fault 202 does not subdivide subvolume 204 either, this is not an inconsistency: a fault can terminate (or "die out") anywhere in a layer.

Figure 8D:
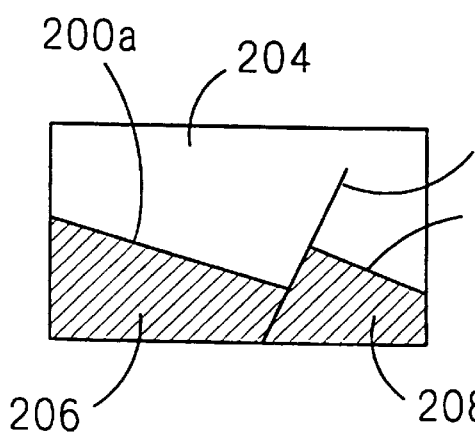
Figure 8E:
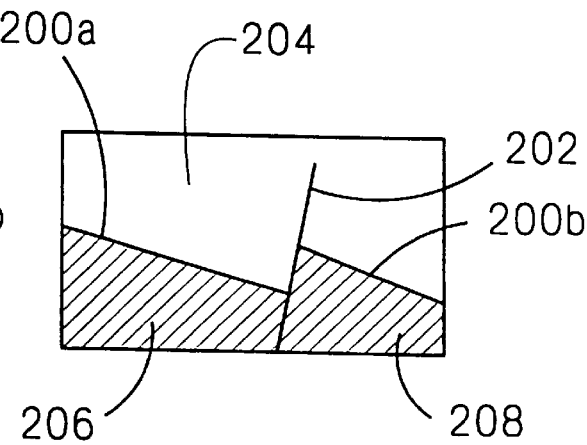

Several forms of resolution are possible. Since horizon cell 200*a* is in close proximity to fault 202, one form of resolution is to extend horizon cell 200*a* to match up with fault 202 and remove from the model the portion of horizon cell 200*b* extending to the left of fault 202, as shown in FIG. 8*d*. Another possibility is to rotate or shift fault 202 to match horizon cells 200*a* and 200*b*, as shown in FIG. 8*e*.

Figure 9A:
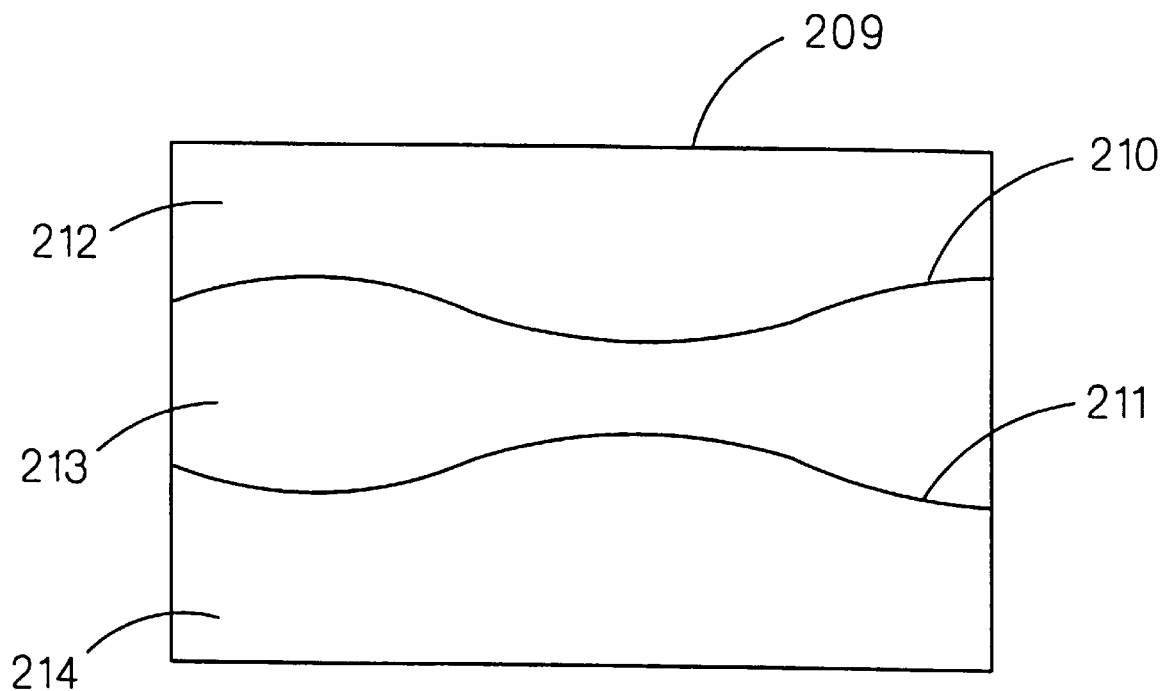
Figure 9B:
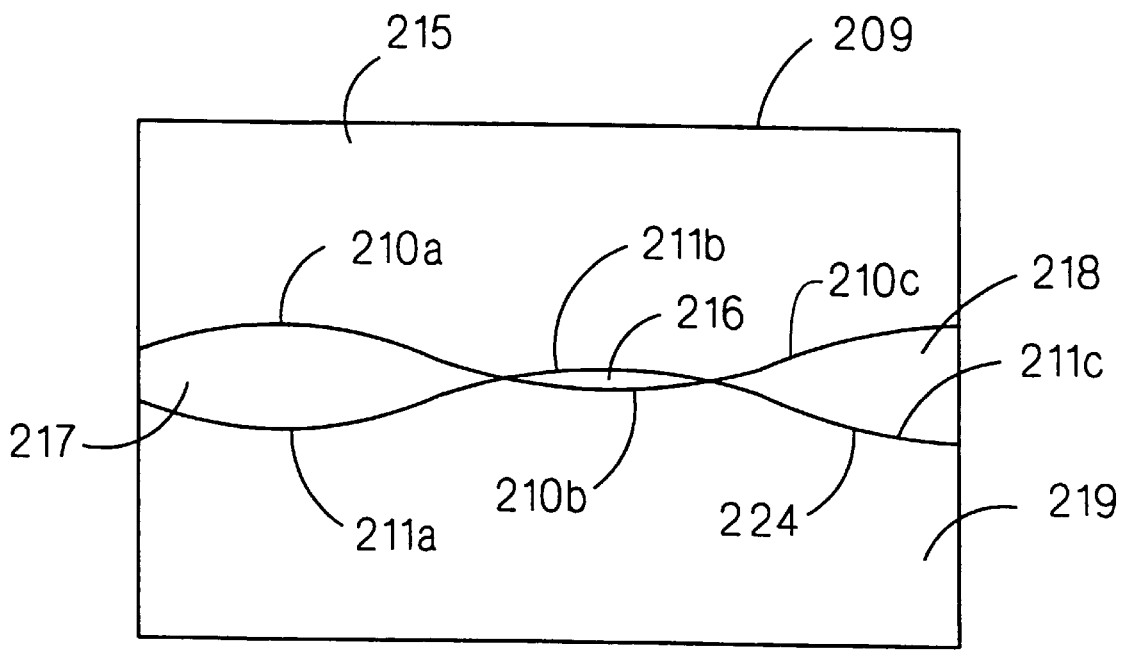

Inconsistencies in shape can also be detected and resolved. For example, suppose that a region-of-interest 209 is divided by surfaces 210 and 211 into three layers 212, 213 and 214, as shown in FIG. 9*a*. Suppose that the user wishes to move surface 211 to a new position close to surface 210, but accidently moves surface 211 so that it overlaps surface 210, as shown in FIG. 9*b*. This might happen because of the granularity of the device, such as a mouse, being used to move the surface, because of the inability of the user to control the moving device or for some other reason.

The movement of surface 211 occurs in two steps. In the first, surface 211 is dissociated from the region of interest and sub-regions 213 and 214 are merged. In the second step, surface 211 is classified into the region of interest. The classification causes sub-region 212 to be split into two sub-regions 215 and 216, and causes the sub-region which was the merger of sub-regions 213 and 214 to be split into three sub-regions: 217, 218 and 219.

Sub-region 212 is split by invoking a split callback. The callback processes the following detection method and resolution method:

Small volume rule (detection): A child subvolume of a split of a parent subvolume must have at least a predefined percentage of the volume of the parent subvolume.

Small volume rule (resolution): Dissociate one of the surfaces bounding the child subvolume.

In the example, subvolumes 217 and 218 are found to have a volume above the "predefined percentage" of the volume of the subvolume that was the merger of volumes 213 and 214. When the volume of subvolume 215 is compared to volume of subvolume 212, on the other hand, it is found to violate the small volume rule.

When surface 211 was classified into the position shown in FIG. 9*b*, surfaces 210 and 211 were split into three cells each, 210*a*, 210*b*, 210*c* and 211*a*, 211*b*, 211*c*, respectively. The resolution method is to delete one of the two surface cells, 210*b* and 211*b*, bounding subvolume 216. Assume that the application chooses to dissociate surface 211*b*. In that case, subvolume 216 is merged into subvolume 215.

A variation on the "small volume rule" may be necessary in some instances when two nearly identical surfaces are moved very close to each other but are still separated. This might happen, for example, when a user is trying to move one surface on top of another knowing that they are the same surface. In such a case, the volume of the subvolume between the two surfaces is very large, because the extent of the surfaces is very large, and the "small volume rule" would not have the desired effect. The variation on the detection method of the rule would determine the ratio of the surface area of a subvolume to its volume and require it to be below a predetermined value. In the example, the ratio would not be below the predetermined value and the resolution method would be invoked.

In the context of a classification involving rules, we call a feature that is being classified against a model a "seed" and the model before classification the "background." Using this terminology, a framework for rule-based modeling is defined that may include a number of components.

First, an expected value or range of values for a property may be specified. In FIG. 8*a*, the expected value of fault 190*a*'s, 190*b*'s age property is an age greater than the age of surface 192. The expected structural characteristic of surface 192 is that it is connected to two subvolumes 194, 196 and in particular is not a crack within a single subvolume.

Second, an inconsistency detection method is provided. This algorithm detects where properties are different from their expected values, or where topological relationships do not match structural characteristics. Geometric inconsistencies (e.g, subdivision of a volume into two parts with one part being very small; such as the "lens" 210 between layers 212 and 214 in FIG. 2*a*) or connectivity inconsistencies (such as horizon cell 200*a* and fault 202 in FIG. 8*b*) are the expected failure modes. The method is invoked whenever a background feature is split or is the target in an embed operation. The inconsistency detection method returns a status describing the type of inconsistency found, if any, and a list of seed and background features that are affected by the inconsistency.

Some inconsistencies cannot be fully detected during classification (see discussion of "potential inconsistencies" below). In these cases, the inconsistency detection algorithm may be automatically invoked after the classification has finished.

Third, an inconsistency resolution method is provided. This algorithm implements the strategy to resolve an inconsistency. The method returns a status and, optionally, a list of affected cells.

Inconsistency resolution has to be delayed until the classification has finished. This is the safest and most frequently used mode. It is believed that in the future the geometry engine will allow classification to be aborted before normal completion, which will allow some inconsistencies to be resolved during classification.

Figure 10A:
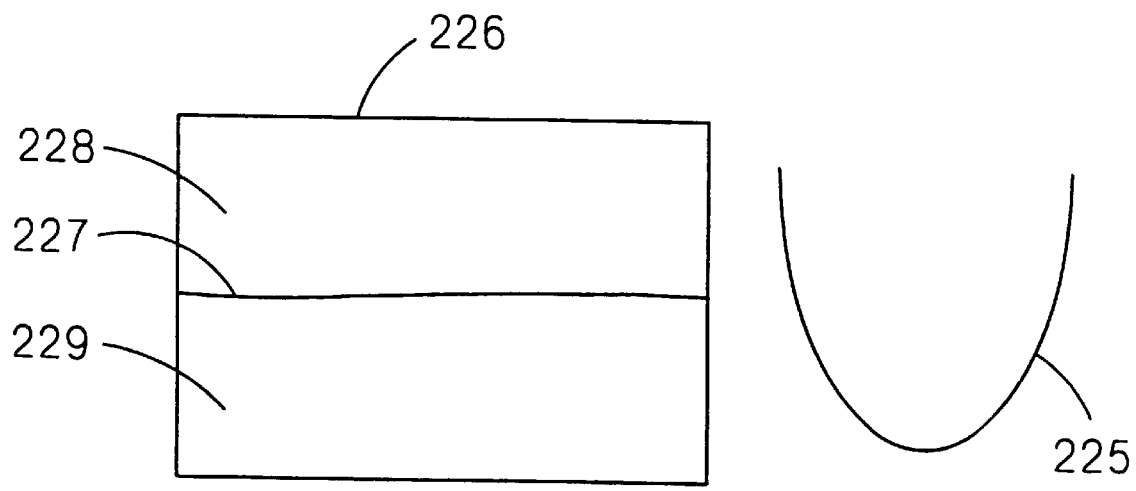
Figure 10B:
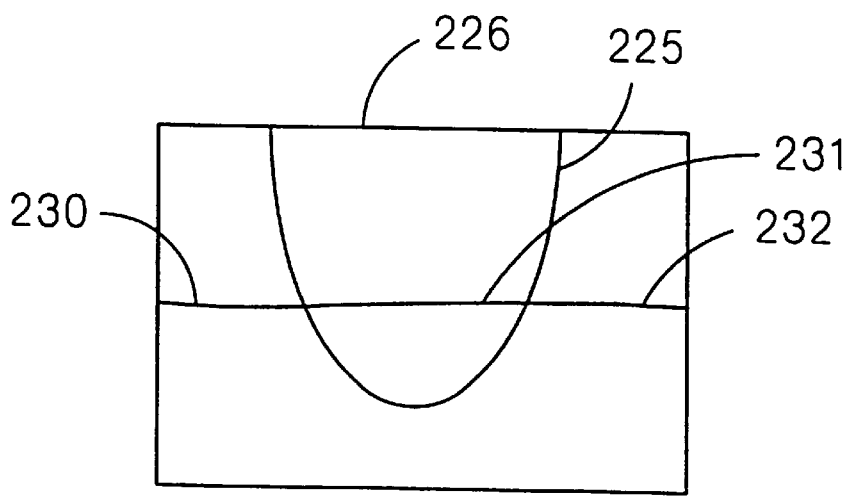

For example, suppose it is desired to classify erosional surface 225, shown in FIG. 10a, into volume of interest 226 which is already split by surface 227 into subvolumes 228 and 229, producing the volume shown in FIG. 10b. During the classification, it becomes clear that a portion of surface 227 violates the formation age rule, because the erosional surface is younger than surface 227. When the classification is complete, surface 227 has been split into three surface cells 230, 231 and 232, and the system can ascertain that cell 231 violates the formation age rule and dissociate it.

Fourth, an interface to the geometric modeling system is provided that specifies when detection and resolution algorithms are invoked, which parameters they are passed, and what they return.

The system assumes responsibility for invoking the detection and resolution method at appropriate moments. Each application provides its detection and resolution methods. Alternatively, the system may have a library of predefined detection and resolution methods, in which case the application must choose both a detection and a resolution method as a pair. It is possible to devise very complicated rules, but for practical use simple bounds checks are used for error detection.

Rules are associated with features. Preferably, the inconsistency detection and resolution algorithms are only invoked when a feature forms part of the background. Alternately, a rule can be attached at any time to a topologically stable volume (that is, a volume not undergoing a classification), causing the system to reevaluate the material, shape, and connectivity relationships of every cell connected to the volume. Of course, the corresponding seed features are accessible by those algorithms as they run. If a feature does not have an associated rule, any outcome of a classification with respect to the feature is considered correct.

The example of FIG. 8b shows that even seemingly simple rules can involve rather complex processing. However, regardless of a rule's complexity, it can be broken down into specification of what a consistent value is, analysis of consistency, and resolution of inconsistencies. Rules interact with unstable or stable volumes (that is, volumes undergoing classification and not undergoing classification, respectively) only in a limited number of ways, and methods of dealing with those interactions establish a framework which is suitable to handle arbitrary rule definitions.

As one example, if a surface (the "seed") is classified against a consistent and geologically correct model (the "background"), there are five types of inconsistencies that can occur. They are distinguished by the type of resolution method they require and by the point in the classification process they can be detected.

One kind of inconsistency is in the seed's material property assignment or assignments. To resolve such an inconsistency, one or more pieces of the seed must be removed. Such an inconsistency is detectable during embedding the seed. An example is the fault cell 190b in FIG. 8a. The age of seed fault cell 190b is inconsistent with the age of the layer 194 in which it is being embedded.

Another kind of inconsistency occurs in the material property assignment of the background. To resolve such an inconsistency, one or more pieces of the background must disappear, possibly as a result of a dissociate or a merge. The cells that disappear may not be defined until later in the seed feature classification, so their removal might not happen until the seed classification has ended. An example is discussed below in the discussion of FIGS. 15a–f.

Another kind of inconsistency occurs in the seed's topology. To resolve a topological seed inconsistency, the geometry of the seed must be changed to obtain a specified topological structure. This is typically done by asking the user for help which the user provides by sketching a trajectory for extending the seed to its attachment site. Inconsistencies in a seed's topology can be detected during splitting of a subvolume by a seed or by the absence of splitting (see discussion of "potential inconsistency" below).

Figure 11A:
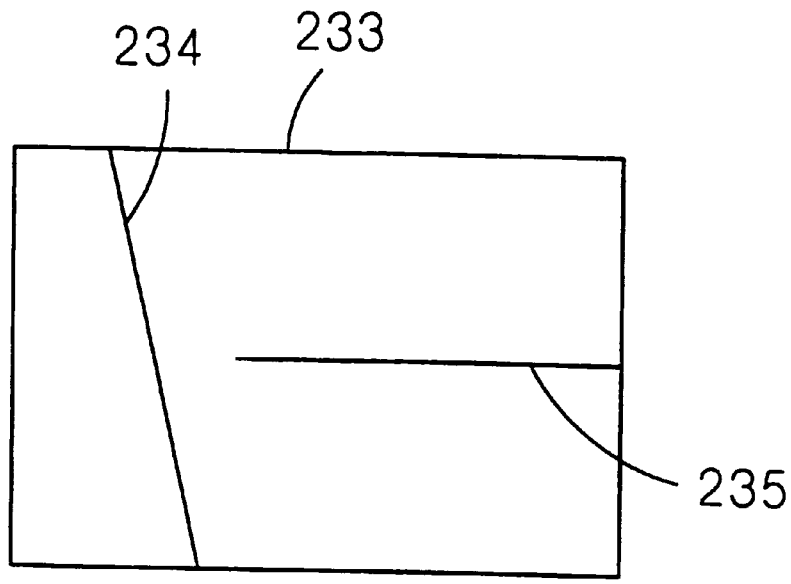
Figure 11B:
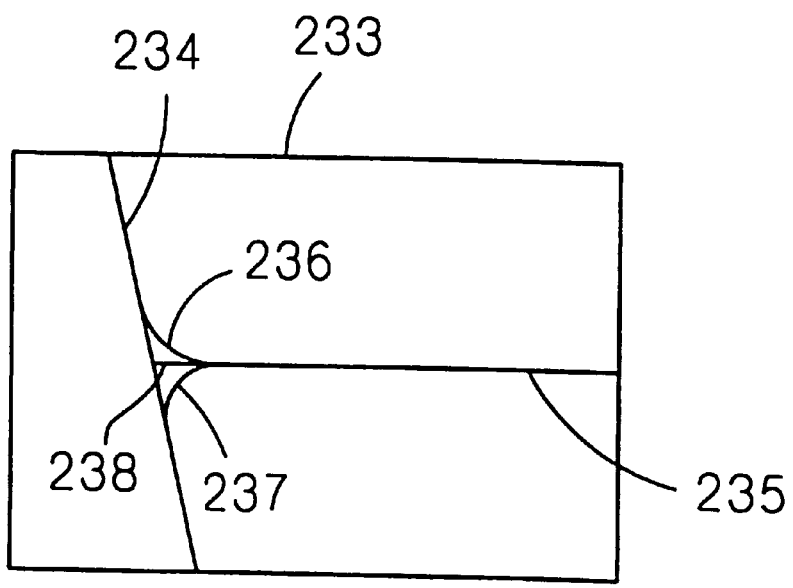

For example, suppose that region of interest 233 is split by a fault 234 and has classified against it surface 235, as shown in FIG. 11a. Suppose that the application has assigned to surface 235 the rule that it connects to all faults in the region of interest. The callback associated with the classification of surface 235 will observe that surface 235 does not satisfy that rule. The resolution method will then ask the user to define how surface 235 is to connect to fault 234. Three responses, 236, 237 and 238, of the infinite possible responses are illustrated in FIG. 11b.

Another kind of inconsistency occurs in the background's topology. To resolve such an inconsistency, the geometry of a background feature must change. This inconsistency can be detected during splitting of a subvolume by a seed or by the absence of splitting (again, see discussion of "potential inconsistencies" below).

Figure 12A:
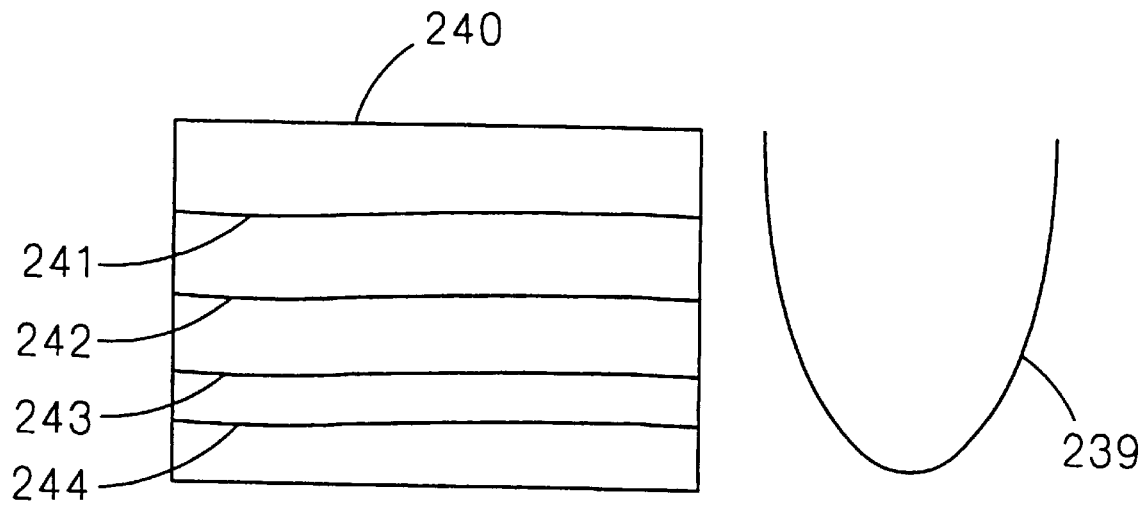
Figure 12B:
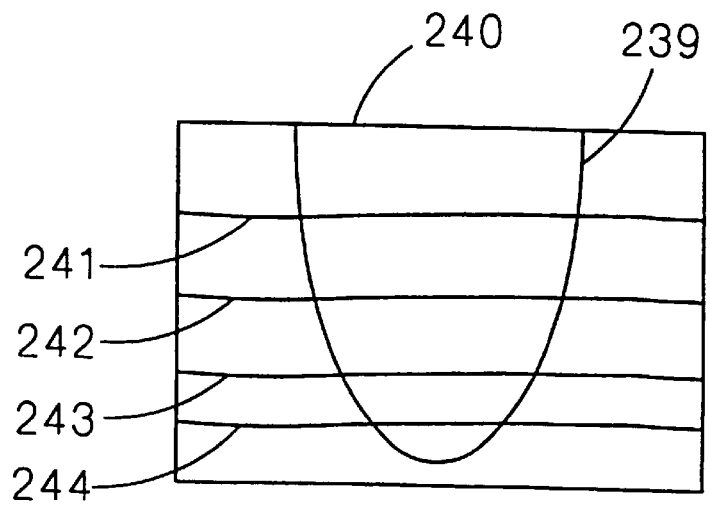

For example, suppose that it is desired to classify erosional surface 239 into volume of interest 240 which is split by depositional surfaces 241, 242, 243 and 244, all younger than erosional surface 239, as shown in FIG. 12a. The result, illustrated in FIG. 12b, shows violations of the formation age rule because segments of each depositional surface 241, 242, 243 and 244 are found within the younger volume enclosed by erosional surface 239. These segments must be dissociated as discussed above with regard to FIGS. 10a and 10b.

This example illustrates another advantage of feature-based modeling. If this example were attempted with a modeling system that was not feature-based, cell-to-cell inconsistencies between the erosional surface and the depositional surfaces would have to be resolved each time the user stopped moving the erosional surface. In contrast, in feature-based modeling, the system need only remember that a feature (the erosional surface) is being moved across some other features (the depositional surfaces). It can defer the resolution of inconsistencies until later. When the classification is complete, the system knows that the erosional surface feature was classified against the depositional surface features and takes care of the cell-to-cell inconsistencies at that time.

Figure 13A:
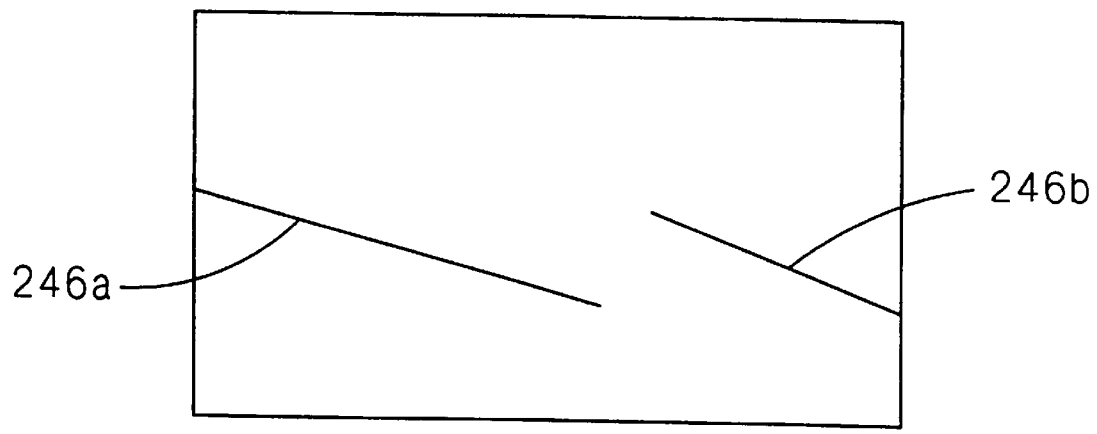
Figure 13B:
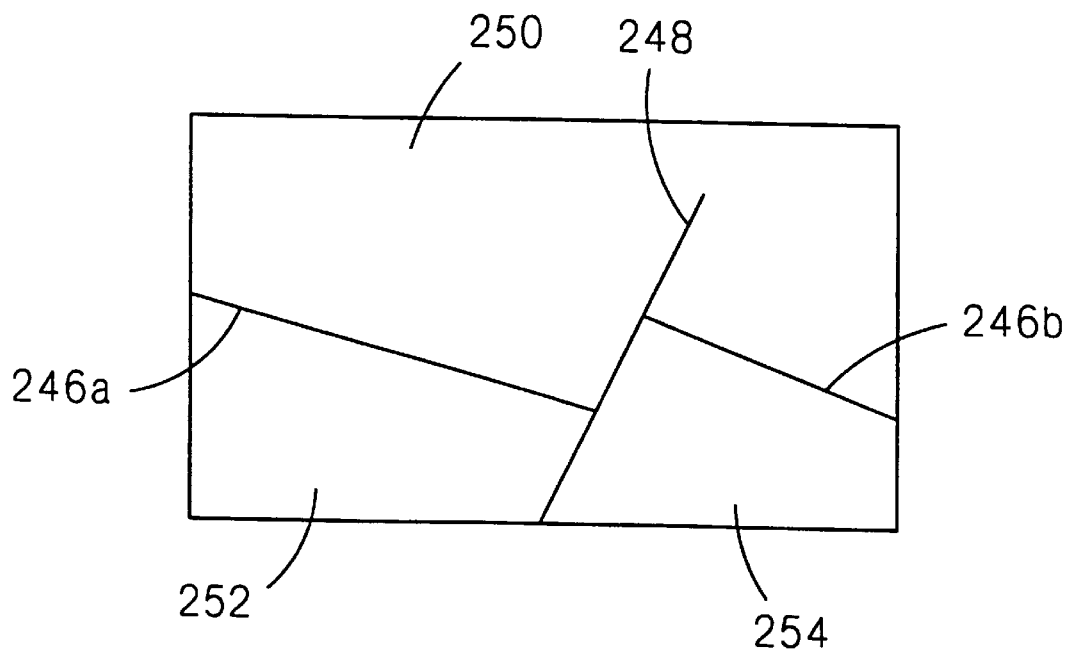

Another kind of inconsistency is a "potential" inconsistency. Some inconsistencies cannot be detected during classification. Consider the insertion of horizon 246a, 246b in FIG. 13a. Horizon 246a, 246b creates a topological seed inconsistency manifested by the fact that no splitting occurs. The inconsistency cannot be readily detected at embedding time because at that time it is not known whether or not a split will occur. Potential inconsistencies therefore are "flagged" during embedding. A subsequent split, such as is caused by the classification of fault 248 will split the region into subregions 250, 252, and 254, as shown in FIG. 13b, and clear the flag. Uncleared flags trigger a property consistency checking method after classification.

An application may elect to tolerate certain inconsistencies over the span of several classifications. The faulted horizon 246a, 246b in FIG. 13a, for example, creates a topological seed inconsistency because it fails to subdivide (split) the background. However, as fault 248 is inserted, the inconsistency is removed, as shown in FIG. 13b.

While in principle any inconsistency could be resolved after classification has finished, early detection is important because it can be used to reduce the amount of required processing. This is particularly relevant when costly material property computations are involved. The order in which surfaces are inserted to build a model also affects performance. This is now shown by reviewing two model building sequences involving an erosional surface.

Figure 14A:
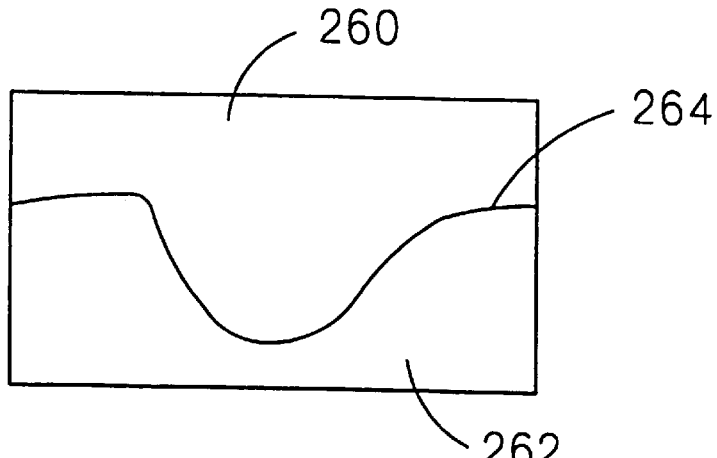
Figure 14B:
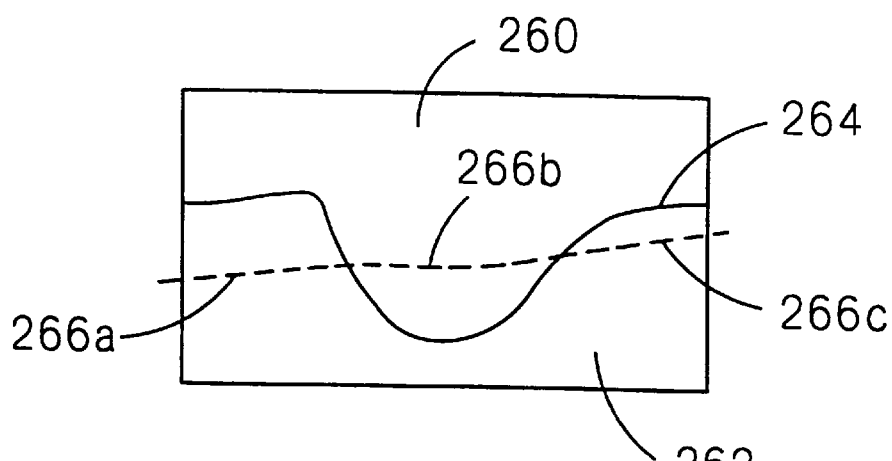
Figure 14C:
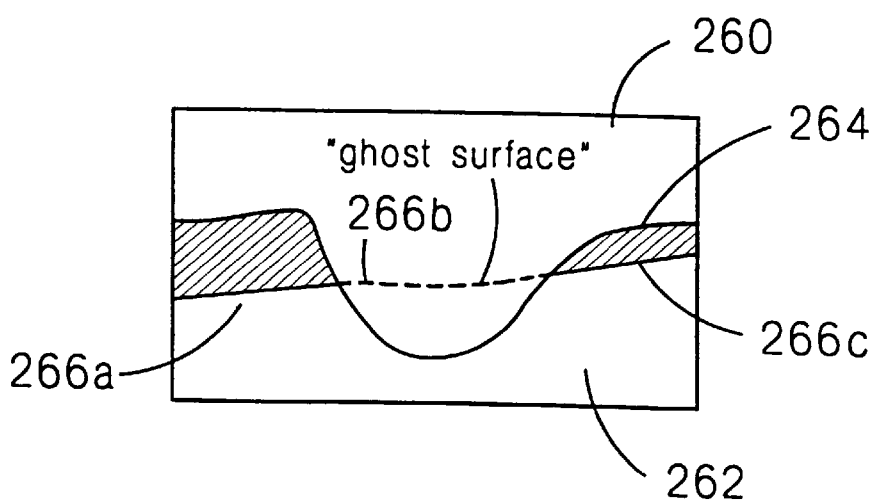

The first sequence, illustrated in FIGS. 14a–c, is an example of a seed inconsistency. The background model consists of two subregions, an younger layer 260 and a older layer 262, separated by an erosional surface 264. Assume that the rule system has been set up like in the example described in the discussion concerning FIG. 8a. A horizon 266a, 266b, 266c is inserted such that it intersects erosional surface 264, as shown in FIG. 14b. Assume that horizon 266a, 266b, 266c is older than erosional surface 264. Horizon cell 266b embedded in layer 260 creates a seed inconsistency that can be resolved by removing horizon cell 266b, creating a "ghost surface" 266b, as shown in FIG. 14c.

The system does not abort a classification once it is launched, so the system is compelled to undo the split event. A major efficiency issue is minimizing changes to the model's material property state by the (temporary) split event. Alternatively, the system may abort the classification in order to block the completion of the split.

During classification, the embedding of horizon cell 266b in layer 260 splits layer 260 into a subregions above and below horizon cell 266b, triggering a split event callback to adjust material property assignments. The split event callback creates two material property files, one for each of the subregions on either side of horizon cell 266b. The two subregions above and below horizon cell 266b formed from layer 260 exist only temporarily, however, since the embedding of horizon cell 266b generated an inconsistency. After removal of horizon cell 266b, and merger of the two earlier-created material property files, layer 260's material property assignments will be identical to those before the classification. Therefore, temporarily changing layer 260's property assignment is a waste of time and system resources, such as disk space. The system prevents this by simply blocking property updates when a seed inconsistency has been detected.

The second sequence involves a background inconsistency. Consider a set of layers 270, 272, 274, shown in FIG. 15a, to which an erosional surface 236a–c is added, as shown in FIG. 15b. Assume that erosional surface 276a–c is younger than layers 270 and 272 but older than layer 274. Again, the Formation Age Rule defined previously requires that geological age relationships be honored. Looking just at the result, shown in FIG. 15f, this example is equivalent to that in FIGS. 14a–c, but the order in which the surfaces were introduced causes significant differences in workload. The processing of the classification of erosional surface 276a–c is depicted piece by piece from FIGS. 15c–15f; the actual order in which processing of erosional surface 276a–c occurs is not defined and does not matter for this discussion.

Initially, the embedding of erosional surface 276a–c in layer 272 causes layer 272 to split into two subregions on either side of erosional surface 276a, as shown in FIG. 15c. At this time, the inconsistent region of layer 272 that eventually is going to be eroded, i.e. merged with layer 274, is not completely defined. At the point shown in FIG. 15c, the portion of layer 272 to the right of erosional surface 276a is inconsistent. When erosional surface 276b is classified into layer 270, the portion of layer 270 above erosional surface 276b becomes inconsistent. Only after all of erosional surface 276a–c has been embedded into layers 270 and 272, as shown in FIG. 15e, is the extent of the inconsistent region known. Consequently, the best that can be done during the embedding of erosional surface 276a–c is to record whenever the seed creates an inconsistency in the background. In a second processing step, after all regions are completely defined, an algorithm can be invoked to resolve inconsistencies.

After the classification of erosional surface 276a–c, illustrated in FIGS. 15c–e, inconsistent subregions exist within layers 270 and 272 (subregions 278 and 280, respectively). According to the rule, both inconsistent subregions eventually must be merged with layer 274. This has two consequences for the material property assignment in each layer. First, layer 272 is split into layers 282 and 284, illustrated in FIG. 15f, so their properties must be updated accordingly. Second, merging is a pairwise operation. Intermediate property assignments must be generated as intermediate subregions are formed. For example, subregions 278 and 280 could be merged first, and then the result would be merged with layer 274. Alternatively, subregion 280 could be merged with layer 274 first, and then subregion 278 could be merged with the result. Depending on the work to be performed to update material properties after each merge, this can be an expensive computation.

Resolving a background inconsistency is more expensive than resolving a seed inconsistency, because of the larger number of splits and subsequent merges. Editing an existing model leads unavoidably to background inconsistencies, but careful ordering of the sequence in which a model is built can trade costly background inconsistency detection and resolution for cheaper seed inconsistency detection and resolution. In general, it is best to first classify faults, then erosional surfaces, then intrusional surfaces (such as salt domes), and last, horizons.

Figure 16A:
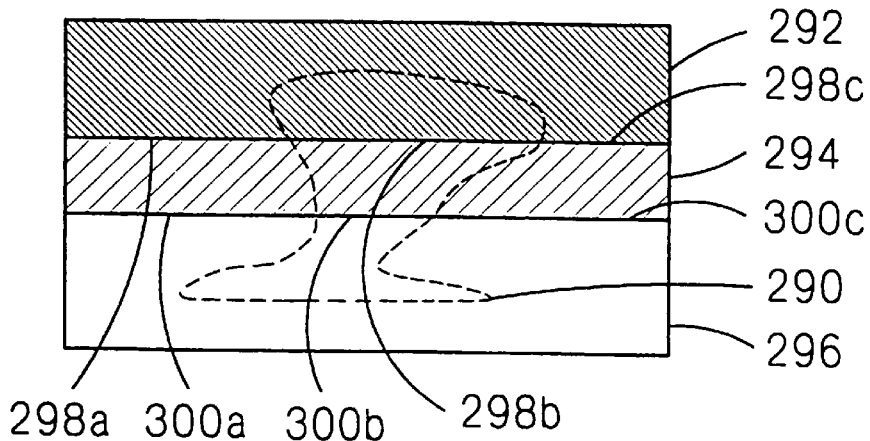
Figure 16B:
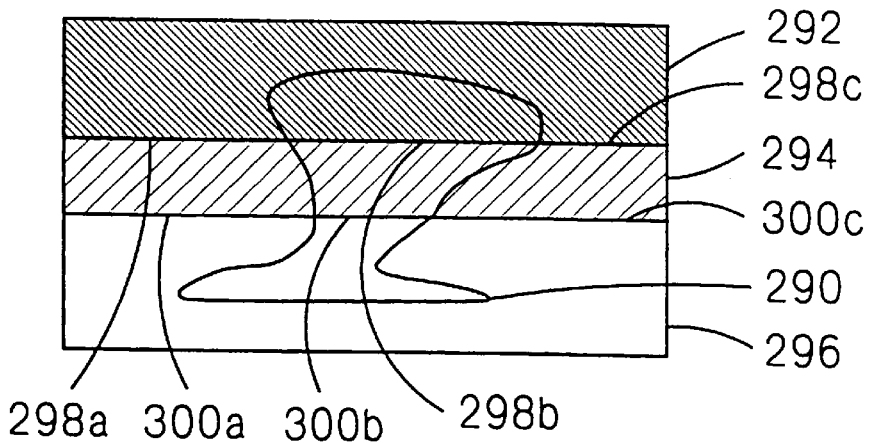
Figure 16C:
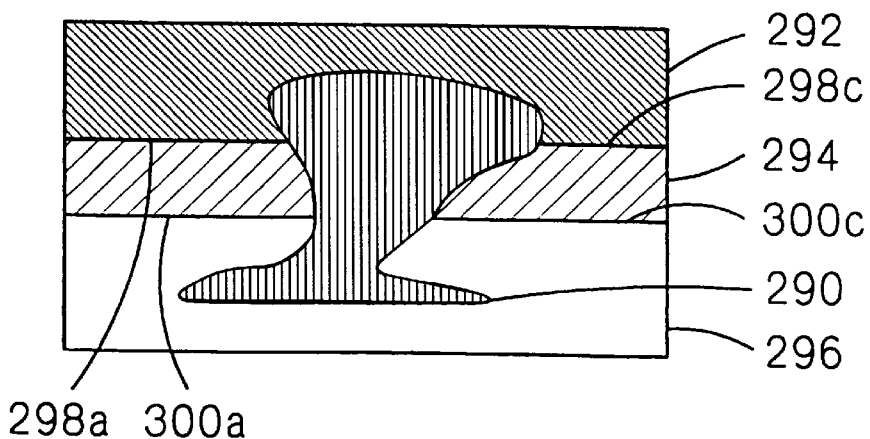

Classification of a surface or volume against a model can be treated as a rule-based restriction of an ordinary set-theoretic union. As a consequence, an application can define its own family of custom classification operators by defining an appropriate set of rules. For example, rules referring to structural characteristics can be used in conjunction with the union operator to create customized classification operators. For example, one possible implementation of the insert operator can be used to embed a salt body 290 into a model, as shown in FIGS. 16a–c.

Assume that a rule specifies that salt body 290 does not have internal boundaries. Unioning of the salt body 290 and the model consisting of layers 292, 294, and 296 and horizons 298a–c and 300a–c yield the result shown in FIG. 16b. During classification of the salt body, background inconsistencies will be detected because pieces of horizons 298a–c and 300a–c get embedded in the salt body and subdivide it, as shown in FIG. 16b. The resolution algorithm associated with the rule will be called which removes horizon cells 298b and 300b from the salt body. The end result is shown in FIG. 16c. The salt body is embedded in the layer sequence, and has no internal structure as required by the rule. Its shape and internal structure are the same as at the beginning of the classification.

Applications can create their own customized topology operators by defining a classification operator as rule-based set-theoretic union. When the resolution of inconsistencies involves pruning of model parts, these operators can be as efficient as built-in classification methods.

Another example is the rule of focused classification which accounts for the tendency of users to create features that are larger than they need to be. For example, a region 310 may be separated into three fault blocks 312, 314, 316, separated by fault 318 and horizon 320, as shown in FIG. 17*a*. It is desired to classify into region 310 a new horizon 322, shown in FIG. 17*b*, which is large enough to extend entirely across region 310. It is the user's intent that the horizon extend only across fault block 316, but, in an effort to make the horizon large enough, the user has made horizon 322 too large. If horizon 322 were classified into the region, it would extend across the entire region, as shown in FIG. 17*c*.

A focused classification satisfies the following rule, which is implemented by the inconsistency resolution method:

Focused classification rule (detection): Subvolume subdivision is permitted if and only if the application says so.

Focused classification rule (resolution): Deactivate the region of overlap in the horizon and make no change in the unallowed block.

Applying this rule to the example just discussed, if a horizon 322 overlaps an unallowed fault block 314, as shown in FIG. 17*d*, the inconsistency resolution method deactivates the portion of the horizon that overlaps the unallowed fault block, illustrated by the dashed portion of horizon 322 in FIG. 17*d*.

Figure 18:
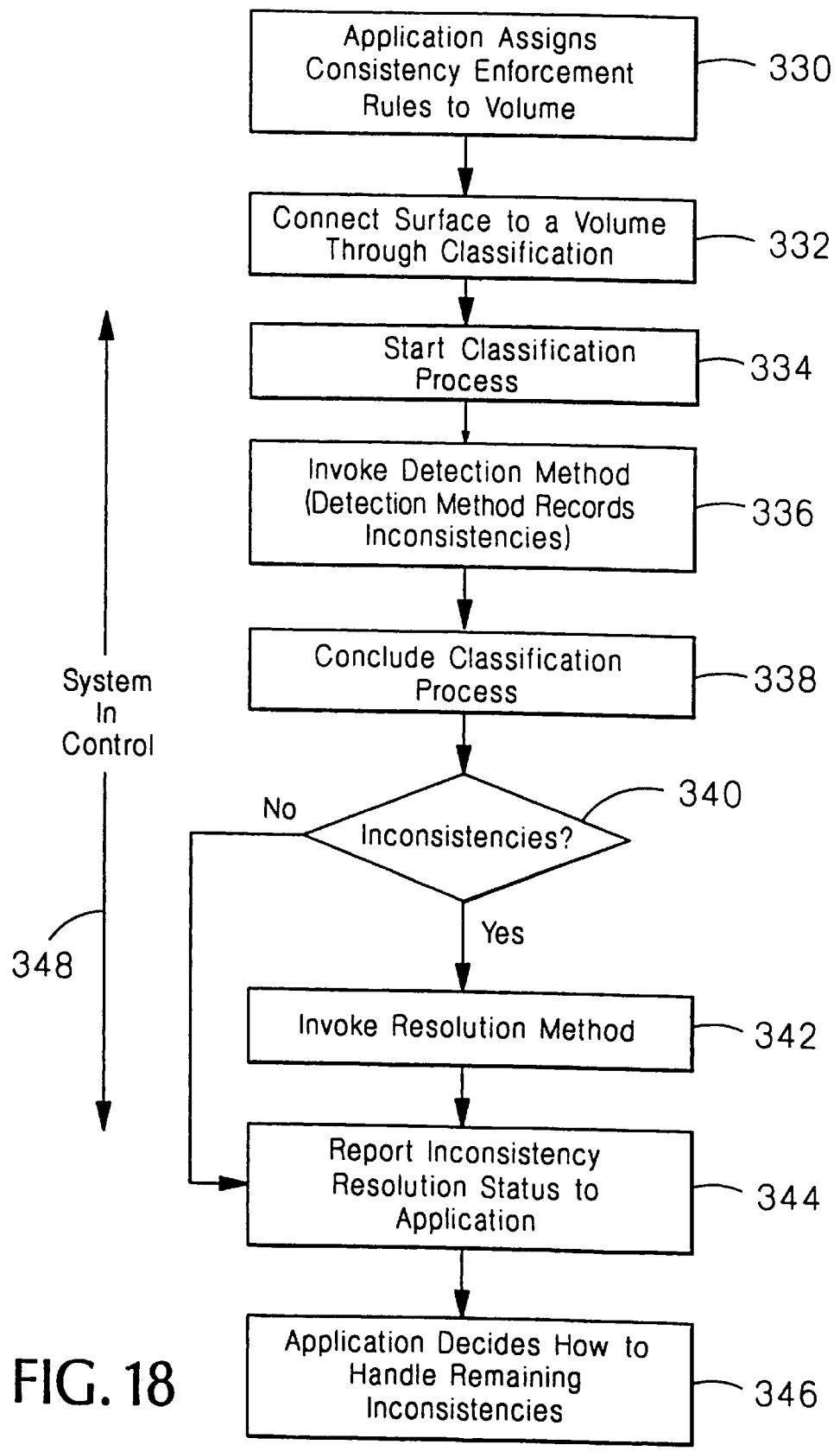
FIG. 18 is a flow chart.

The rules-based system operates as follows: the application assigns consistency enforcement rules to volumes 330, as shown in FIG. 18. When a surface is connected to a volume 332, the system begins the classification process 334. As part of the classification process, a detection method is invoked for each of the callback events spawned by the classification 336. The detection method records the detected inconsistencies. At the conclusion of the classification process 338, the system determines if any inconsistencies were detected during classification 340.

If inconsistencies were detected, a resolution method is invoked for each of the inconsistencies 342. The system then reports to the application the status of the inconsistency resolution methods 344. That is, the system reports what inconsistencies, if any, remain.

The application decides how to handle the remaining inconsistencies 346. The application's processing may include prompting the user for help in resolving the problem or it may simply report the inconsistency to the user.

Inconsistency resolution is under the control of the system from the time that classification begins 334, until all inconsistencies are reported 344, as shown by line 350.

The invention may be implemented in hardware or software, or a combination of both. However, preferably, the invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language (such as C++ or C) to communicate with a computer system. However, the programs can be implemented in assembly or machine language, if desired. In any case, the language may be a complied or interpreted language.

Each such computer program is preferably stored on a storage media or device (e.g., ROM or magnetic/optical disk or diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Other embodiments are within the scope of the following claims.

What is claimed is:

1. A method for adjusting geological data representing a geoscience model of the characteristics of a geological region, the geological data comprising one or more features, each feature comprising a shape, a topology and one or more attributes, to enforce consistency within the geological data, the method being implemented in a programmed computer comprising a processor, a data storage system, at least one input device, and at least one output device, the method and the data being stored on a computer-readable media, the method comprising defining a detection rule and a resolution rule;

detecting an inconsistency by applying the detection rule to one or more of the features; and resolving the inconsistency by applying the resolution rule.

2. The method of claim 1, wherein detecting inconsistency comprises detecting a potential inconsistency.

3. The method of claim 1, wherein resolving inconsistency comprises flagging an inconsistency for later resolution.

4. The method of claim 1, wherein detecting inconsistency comprises detecting an embedded surface cell's age being outside the age range of a host layer for the embedded surface cell.

5. The method of claim 1, wherein detecting inconsistency comprises detecting a point in a subvolume having an age not within the range defined by the subvolume's bounding erosional or depositional surfaces.

6. The method of claim 1, wherein detecting inconsistency comprises detecting a bed boundary not connected to two or more distinct subvolumes.

7. The method of claim 1, wherein detecting inconsistency comprises detecting a horizon which terminates in a layer.

8. The method of claim 1, wherein detecting inconsistency comprises detecting a child subvolume having a volume less than a predefined percentage of the child subvolume's parent's volume.

9. The method of claim 1, wherein detecting inconsistency comprises detecting a ratio of a subvolume's volume to its surface area being less than a predetermined amount.

10. The method of claim 1, wherein detecting inconsistency comprises detecting a first age assignment from a first horizon that is inconsistent with a second age assignment from a second horizon.

11. The method of claim 1, wherein detecting inconsistency comprises detecting a pinched-out layer.

12. The method of claim 1, wherein detecting inconsistency comprises detecting a layer forming lenses.

13. The method of claim 1, wherein detecting inconsistency comprises detecting a cell of a feature embedded into a sub-region where the feature is not allowed.

14. The method of claim 1, wherein resolving inconsistency comprises asking an operator how to extend a surface.

15. The method of claim 1, wherein resolving inconsistency comprises extending a horizon to a nearest surface bounding a layer.

16. The method of claim 1, wherein resolving inconsistency comprises extending a horizon to a geoscience model boundary.

17. The method of claim 1, wherein resolving inconsistency comprises removing a segment of a feature which extends into an unallowed sub-region.

18. The method of claim 1, wherein resolving inconsistency comprises identifying a horizon that contributes to the inconsistency; and removing a segment of the horizon that contributes to the inconsistency.

19. The method of claim 1, wherein resolving inconsistency comprises identifying a first horizon and a second horizon that contribute to the inconsistency; and reshaping the first horizon and the second horizon to maintain a distance between them that is greater than or equal to a preselected amount.

20. The method of claim 1, wherein resolving inconsistency comprises collapsing a small sub-region bounded by a horizon.

21. The method of claim 20, wherein collapsing comprises removing a portion of, the horizon that bounds the small sub-region.

22. The method of claim 1, wherein resolving inconsistency comprises identifying a sub-region created by invalid horizons; and reshaping the invalid horizons to produce a correctly-shaped sub-region.

23. The method of claim 1 wherein resolving the inconsistency using the resolution rule comprises removing the inconsistency.

24. The method of claim 1 wherein resolving the inconsistency using the resolution rule comprises instructing a system responsible for maintaining the geoscience model how to remove the inconsistency.

25. The method of claim 1 wherein resolving the inconsistency using the resolution rule comprises reporting the inconsistency to an application.

26. The method of claim 1 wherein defining a detection rule comprises defining a correct range of a characteristic of the feature.

27. The method of claim 26 wherein the characteristic is the shape of the feature.

28. The method of claim 26 wherein the characteristic is the attribute of the feature.

29. The method of claim 26 wherein the characteristic is the topology of the feature.

30. The method of claim 1 wherein the feature comprises a seed; and detecting an inconsistency comprises detecting the inconsistency as the seed is being classified into a background.

31. The method of claim 30, wherein detecting inconsistency comprises detecting the inconsistency in the seed.

32. The method of claim 31, wherein resolving inconsistency comprises applying the resolution rule to remove a portion of the seed from a topologically active part of the geoscience model.

33. The method of claim 31, wherein resolving inconsistency comprises applying the resolution rule to change a geometry of the seed.

34. The method of claim 31, further comprising blocking property updates.

35. The method of claim 30, wherein detecting inconsistency comprises detecting the inconsistency in the background.

36. The method of claim 35, wherein resolving inconsistency comprises applying the resolution rule to remove a portion of the background from a topologically active part of the geoscience model.

37. The method of claim 35, wherein resolving inconsistency comprises applying the resolution rule to change a geometry of a portion of the background.

38. A computer system for adjusting geological data representing a geoscience model of the characteristics of a geological region, the geological data comprising one or more features, each feature comprising a shape, a topology and one or more attributes, to enforce consistency within the geological data, the computer system comprising a processor, a data storage system, at least one input device, and at least one output device, the geological data being stored on a computer-readable media, the computer system comprising means for defining a detection rule and a resolution rule;

means for detecting an inconsistency by applying the detection rule to one or more of the features; and means for resolving the inconsistency by applying the resolution rule.

39. The computer system of claim 38, wherein the detecting inconsistency means comprises means for detecting a potential inconsistency.

40. The computer system of claim 38, wherein the resolving inconsistency means comprises means for flagging an inconsistency for later resolution.

41. The computer system of claim 38, wherein the detecting inconsistency means comprises means for detecting an embedded surface cell's age being outside the age range of a host layer for the embedded surface cell.

42. The computer system of claim 38, wherein the detecting inconsistency means comprises means for detecting a point in a subvolume having an age not within the range defined by the subvolume's bounding erosional or depositional surfaces.

43. The computer system of claim 38, wherein the detecting inconsistency means comprises means for detecting a bed boundary not connected to a two or more distinct subvolumes.

44. The computer system of claim 38, wherein the detecting inconsistency means comprises means for detecting a horizon which terminates in a layer.

45. The computer system of claim 38, wherein the detecting inconsistency means comprises means for detecting a child subvolume having a volume less than a predefined percentage of the child subvolume's parent's volume.

46. The computer system of claim 38, wherein the detecting inconsistency means comprises means for detecting a ratio of a subvolume's volume to its surface area being less than a predetermined amount.

47. The computer system of claim 38, wherein the detecting inconsistency means comprises means for detecting a first age assignment from a first horizon that is inconsistent with a second age assignment from a second horizon.

48. The computer system of claim 38, wherein the detecting inconsistency means comprises means for detecting a pinched-out layer.

49. The computer system of claim 38, wherein the detecting inconsistency means comprises means for detecting a layer forming lenses.

50. The computer system of claim 38, wherein the detecting inconsistency means comprises means for detecting a cell of a feature embedded into a sub-region where the feature is not allowed.

51. The computer system of claim 38, wherein the resolving inconsistency means comprises means for asking an operator how to extend a surface.

52. The computer system of claim 38, wherein the resolving inconsistency means comprises means for extending a horizon to a nearest surface bounding a layer.

53. The computer system of claim 38, wherein the resolving inconsistency means comprises means for extending a horizon to a geoscience model boundary.

54. The computer system of claim 38, wherein the resolving inconsistency means comprises means for removing a segment of a feature which extends into an unallowed sub-region.

55. The computer system of claim 38, wherein the resolving inconsistency means comprises means for identifying a horizon that contributes to the inconsistency; and means for removing a segment of the horizon that contributes to the inconsistency.

56. The computer system of claim 38, wherein the resolving inconsistency means comprises means for identifying a first horizon and a second horizon that contribute to the inconsistency; and means for reshaping the first horizon and the second horizon to maintain a distance between them that is greater than or equal to a preselected amount.

57. The computer system of claim 38, wherein the resolving inconsistency means comprises means for collapsing a small sub-region bounded by a horizon.

58. The computer system of claim 57, wherein the collapsing means comprises means for removing a portion of the horizon that bounds the small sub-region.

59. The computer system of claim 38, wherein the resolving inconsistency means comprises means for identifying a sub-region created by invalid horizons; and means for reshaping the invalid horizons to produce a correctly-shaped sub-region.

60. The computer system of claim 38 wherein the means for resolving the inconsistency by applying the resolution rule comprises means for removing the inconsistency.

61. The computer system of claim 38 wherein the means for resolving the inconsistency by applying the resolution rule comprises means for instructing a system responsible for maintaining the geoscience model how to remove the inconsistency.

62. The computer system of claim 38 wherein the means for resolving the inconsistency by applying the resolution rule comprises means for reporting the inconsistency to an application.

63. The computer system of claim 38 wherein the means for defining a detection rule comprises means for defining a correct range of a characteristic of the feature.

64. The computer system of claim 63 wherein the characteristic is the shape of the feature.

65. The computer system of claim 63 wherein the characteristic is the attribute of the feature.

66. The method of claim 63, wherein the characteristic is the topology of the feature.

67. The computer system of claim 38 wherein the feature comprises a seed; and the means for detecting an inconsistency comprises means for detecting the inconsistency as the seed is being classified into a backgrounds.

68. The computer system of claim 67, wherein the detecting inconsistency means comprises means for detecting the inconsistency in the seed.

69. The computer system of claim 68, wherein the resolving inconsistency means comprises means for applying the resolution rule to remove a portion of the seed from a topologically active part of the geoscience model.

70. The computer system of claim 68, wherein the resolving inconsistency means comprises means for applying the resolution rule to change a geometry of the seed.

71. The computer system of claim 68, further comprising means for blocking property updates.

72. The computer system of claim 67, wherein the detecting inconsistency means comprises means for detecting the inconsistency in the background.

73. The computer system of claim 72, wherein the resolving inconsistency means comprises means for applying the resolution rule to remove a portion of the background from a topologically active part of the geoscience model.

74. The computer system of claim 72, wherein the resolving inconsistency means comprises means for applying the resolution rule to change a geometry of a portion of the background.

75. A computer program, residing on a computer-readable medium, for adjusting geological data representing a geoscience model of the characteristics of a geological region, the geological data comprising one or more features, each feature comprising a shape, a topology and one or more attributes, to enforce consistency within the geological data the computer program comprising instructions for causing the computer, comprising a processor, a data storage system, at least one input device, and at least one output device, to define a detection rule and a resolution rule;

detect an inconsistency by applying the detection rule to one or more of the features; and resolve the inconsistency by applying the resolution rule.

76. The computer program of claim 75, wherein the instructions for causing the computer to detect inconsistency comprise instructions for causing the computer to detect a potential inconsistency.

77. The computer program of claim 75, wherein the instructions for causing the computer to resolve inconsistency comprise instructions for causing the computer to flag an inconsistency for later resolution.

78. The computer program of claim 75, wherein the instructions for causing the computer to detect inconsistency comprise instructions for causing the computer to detect an embedded surface cell's age being outside the age range of a host layer for the embedded surface cell.

79. The computer program of claim 75, wherein the instructions for causing the computer to detect inconsistency comprise instructions for causing the computer to detect a point in a subvolume having an age not within the range defined by the subvolume's bounding erosional or depositional surfaces.

80. The computer program of claim 75, wherein the instructions for causing the computer to detect inconsistency comprise instructions for causing the computer to detect a bed boundary not connected to a two or more distinct subvolumes.

81. The computer program of claim 75, wherein the instructions for causing the computer to detect inconsistency comprise instructions for causing the computer to detect a horizon which terminates in a layer.

82. The computer program of claim 75, wherein the instructions for causing the computer to detect inconsistency comprise instructions for causing the computer to detect a child subvolume having a volume less than a predefined percentage of the child subvolume's parent's volume.

83. The computer program of claim 75, wherein the instructions for causing the computer to detect inconsistency comprise instructions for causing the computer to detect a ratio of a subvolume's volume to its surface area being less than a predetermined amount.

84. The computer program of claim 75, wherein the instructions for causing the computer to detect inconsistency comprise instructions for causing the computer to detect a first age assignment from a first horizon that is inconsistent with a second age assignment from a second horizon.

85. The computer program of claim 75, wherein the instructions for causing the computer to detect inconsistency comprise instructions for causing the computer to detect a pinched-out layer.

86. The computer program of claim 75, wherein the instructions for causing the computer to detect inconsistency comprise instructions for causing the computer to detect a layer forming lenses.

87. The computer program of claim 75, wherein the instructions for causing the computer to detect inconsistency comprise instructions for causing the computer to detect a cell of a feature embedded into a sub-region where the feature is not allowed.

88. The computer program of claim 75, wherein the instructions for causing the computer to resolve inconsistency comprise instructions for causing the computer to ask an operator how to extend surface.

89. The computer program of claim 75, wherein the instructions for causing the computer to resolve inconsistency comprise instructions for causing the computer to extend a horizon to a nearest surface bounding a layer.

90. The computer program of claim 75, wherein the instructions for causing the computer to resolve inconsistency comprise instructions for causing-the computer to extend a horizon to a geoscience model boundary.

91. The computer program of claim 75, wherein the instructions for causing the computer to resolve inconsistency comprise instructions for causing the computer to remove a segment of a feature which extends into an unallowed sub-region.

92. The computer program of claim 75, wherein the instructions for causing the computer to resolve inconsistency comprise instructions for causing the computer to identify a horizon that contributes to the inconsistency; and instructions for causing the computer to remove a segment of the horizon that contributes to the inconsistency.

93. The computer program of claim 75, wherein the instructions for causing the computer to resolve inconsistency comprise instructions for causing the computer to identify a first horizon and a second horizon that contribute to the inconsistency; and instructions for causing the computer to reshape the first horizon and the second horizon to maintain a distance between them that is greater than or equal to a preselected amount.

94. The computer program of claim 75, wherein the instructions for causing the computer to resolve inconsistency comprise instructions for causing the computer to collapse a small sub-region bounded by a horizon.

95. The computer program of claim 94, wherein the instructions for causing the computer to collapse the small sub-region comprise instructions for causing the computer to remove a portion of the horizon that bounds the small sub-region.

96. The computer program of claim 75, wherein the instructions for causing the computer to resolve inconsistency comprise instructions for causing the computer to identify a subregion created by invalid horizons; and instructions for causing the computer to reshape the invalid horizons to produce a correctly-shaped subregion.

97. The computer program of claim 75 wherein the feature comprises a seed; and the instructions for causing a computer to detect an inconsistency comprise instructions for causing a computer to detect the inconsistency as the seed is being classified into a background.

98. The computer program of claim 97, wherein the instructions for causing the computer to detect inconsistency comprise instructions for causing the computer to detect the inconsistency in the seed.

99. The computer program of claim 98, wherein the instructions for causing the computer to resolve inconsistency comprise instructions for causing the computer to apply the resolution rule to remove a portion of the seed from a topologically active part of the geoscience model.

100. The computer program of claim 98, wherein the instructions for causing the computer to resolve inconsistency comprise instructions for causing the computer to apply the resolution rule to change a geometry of the seed.

101. The computer program of claim 98, to further comprising instructions for causing the computer to block property updates.

102. The computer program of claim 97, wherein the instructions for causing the computer to detect inconsistency comprise instructions for causing the computer to detect the inconsistency in the background.

103. The computer program of claim 102, wherein the instructions for causing the computer to resolve inconsistency comprise instructions for causing the computer to apply the resolution rule to remove a portion of the background from a topologically active part of the geoscience model.

104. The computer program of claim 102, wherein the instructions for causing the computer to resolve inconsistency comprise instructions for causing the computer to apply the resolution rule to change a geometry of a portion of the background.

105. The computer program of claim 75 wherein the instructions for causing the computer to resolve the inconsistency using the resolution rule comprise instructions for causing the computer to remove the inconsistency.

106. The computer program of claim 75 wherein the instructions for causing the computer to resolve the inconsistency using the resolution rule comprise instructions for causing the computer to instruct a system responsible for maintaining the geoscience model how to remove the inconsistency.

107. The computer program of claim 75 wherein the instructions for causing the computer to resolve the inconsistency using the resolution rule comprise instructions for causing the computer to report the inconsistency to an application.

108. The computer program of claim 75 wherein the instructions for causing the computer to define a detection rule comprise instructions for causing the computer to define a correct range of a characteristic of the feature.

109. The method of claim 108 wherein the characteristic is the shape of the feature.

110. The method of claim 108 wherein the characteristic is the attribute of the feature.

111. The method of claim 108 wherein the characteristic is the topology of the feature.

* * * * *